(12) United States Patent
Iraqi et al.

(10) Patent No.: US 10,858,528 B2
(45) Date of Patent: Dec. 8, 2020

(54) RUB-RESISTANT INKJET COMPOSITION

(71) Applicant: Kornit Digital Ltd., Rosh HaAyin (IL)

(72) Inventors: Muhammad Iraqi, Tira (IL); Jacob Mozel, Kfar-Saba (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 15/774,006

(22) PCT Filed: Dec. 22, 2016

(86) PCT No.: PCT/IL2016/051375
§ 371 (c)(1),
(2) Date: May 6, 2018

(87) PCT Pub. No.: WO2017/109786
PCT Pub. Date: Jun. 29, 2017

(65) Prior Publication Data
US 2018/0320016 A1    Nov. 8, 2018

Related U.S. Application Data

(60) Provisional application No. 62/387,162, filed on Dec. 23, 2015.

(51) Int. Cl.
*C09D 11/54* (2014.01)
*C09D 11/12* (2006.01)
(Continued)

(52) U.S. Cl.
CPC .......... *C09D 11/54* (2013.01); *B41M 5/0017* (2013.01); *C09D 11/102* (2013.01);
(Continued)

(58) Field of Classification Search
CPC .......... B41M 5/0011; B41M 5/0017; B41M 5/0047; B41M 7/00; B41M 7/0072;
(Continued)

(56) References Cited

U.S. PATENT DOCUMENTS 5,709,976 A    1/1998  Malhotra
6,001,904 A    12/1999 Matzinger et al.
(Continued)

FOREIGN PATENT DOCUMENTS

EP    0581135    2/1994
EP    2412766    2/2012
(Continued)

OTHER PUBLICATIONS

Supplementary European Search Report and the European Search Opinion dated Jul. 23, 2019 From the European Patent Office Re. Application No. 16877903.1. (7 Pages).
(Continued)

*Primary Examiner* — Manish S Shah

(57) ABSTRACT

Provided herein is an ink immobilizing composition that includes colloidal wax particles and a property-adjusting agent, being capable of causing immobilization of a property-sensitive ink composition upon contact therebetween on the surface of a substrate, as well as a process of printing a rub-resistant image, a kit for printing a rub-resistant image, and a substrate having a rub-resistant image printed thereon.

22 Claims, 1 Drawing Sheet

(51) Int. Cl.
*C09D 11/322* (2014.01)
*C09D 11/107* (2014.01)
*C09D 11/38* (2014.01)
*D06P 5/30* (2006.01)
*B41M 5/00* (2006.01)
*C09D 11/102* (2014.01)
*D06P 1/653* (2006.01)
*D06P 1/52* (2006.01)

(52) U.S. Cl.
CPC ............ *C09D 11/107* (2013.01); *C09D 11/12* (2013.01); *C09D 11/322* (2013.01); *C09D 11/38* (2013.01); *D06P 5/30* (2013.01); *D06P 1/5221* (2013.01); *D06P 1/6533* (2013.01)

(58) Field of Classification Search
CPC .... B41M 5/52; B41M 5/5218; B41J 2/04588; B41J 2/04595; B41J 2/04586; B41J 2/14274; B41J 11/0015; B41J 11/002; B41J 2/1433; B41J 2/161; B41J 2/1623; B41J 2202/00; B41J 2202/03; B41J 2/14201; B41J 2/045; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 3/4078; B41J 29/377; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B65H 23/26; B65H 2404/14211; D06P 5/001; D06B 19/0076
See application file for complete search history.

(56) References Cited

U.S. PATENT DOCUMENTS

| | | | |
|---|---|---|---|
| 6,020,399 A | 2/2000 | Matzinger | |
| 6,022,673 A | 2/2000 | Ishikawa | |
| 6,482,883 B1 | 11/2002 | Cuch et al. | |
| 6,660,348 B2 | 12/2003 | Cuch et al. | |
| 6,742,456 B1 | 6/2004 | Kasperchik et al. | |
| 6,799,884 B2 | 8/2004 | Ma et al. | |
| 6,900,851 B2 | 5/2005 | Morrison et al. | |
| 6,951,671 B2 | 10/2005 | Mukherjee et al. | |
| 7,134,395 B2 | 11/2006 | Riley et al. | |
| 7,361,399 B2 | 4/2008 | Song et al. | |
| 7,427,641 B2 | 9/2008 | Kataoka et al. | |
| 7,449,605 B2 | 11/2008 | Chang et al. | |
| 7,682,434 B2 | 3/2010 | Akers, Jr. et al. | |
| 7,767,768 B2 | 8/2010 | Chang et al. | |
| 7,955,470 B2 | 6/2011 | Kapp et al. | |
| 8,092,873 B2 | 1/2012 | Wang et al. | |
| 8,129,448 B2 | 3/2012 | Lee et al. | |
| 8,206,618 B2 | 6/2012 | Moriyama et al. | |
| 8,273,659 B2 | 9/2012 | Lennon et al. | |
| 8,506,849 B2 | 8/2013 | Li et al. | |
| 8,541,070 B2 | 9/2013 | Wang et al. | |
| 8,546,637 B2 | 10/2013 | Holm et al. | |
| 8,673,237 B2 | 3/2014 | Schalkhammer | |
| 8,783,844 B2 | 7/2014 | Ohta | |
| 8,846,798 B2 | 9/2014 | Fu et al. | |
| 8,865,277 B2 | 10/2014 | Zhou et al. | |
| 8,911,074 B2 | 12/2014 | Ohta | |
| 9,045,712 B2 | 6/2015 | Dayton et al. | |
| 9,079,681 B1 | 7/2015 | Schwendimann et al. | |
| 9,108,404 B2 | 8/2015 | Okuyama | |
| 9,133,355 B2 | 9/2015 | Brandstein et al. | |
| 2002/0086933 A1 | 7/2002 | Matzinger | |
| 2002/0137850 A1 | 9/2002 | Matzinger | |
| 2003/0021962 A1 | 1/2003 | Mukherjee et al. | |
| 2004/0052746 A1 | 3/2004 | Tamareselvy et al. | |
| 2004/0094058 A1 | 5/2004 | Kasperchik et al. | |
| 2004/0219310 A1 | 11/2004 | Ogata et al. | |
| 2004/0249018 A1 | 12/2004 | Kataoka et al. | |
| 2005/0074601 A1 | 4/2005 | Onishi | |
| 2007/0054979 A1 | 3/2007 | Hees et al. | |
| 2009/0071366 A1 | 3/2009 | Akers, Jr. et al. | |
| 2009/0079784 A1* | 3/2009 | Chiwata | B41J 2/2114 347/21 |
| 2010/0080913 A1 | 4/2010 | Irita | |
| 2010/0160536 A1 | 6/2010 | Lee et al. | |
| 2011/0032304 A1* | 2/2011 | Mozel | B41J 2/2107 347/21 |
| 2011/0032319 A1* | 2/2011 | Kaplan | B41J 2/2107 347/101 |
| 2011/0104408 A1 | 5/2011 | Wang et al. | |
| 2011/0190429 A1 | 8/2011 | Muhammad et al. | |
| 2011/0262724 A1* | 10/2011 | Okuda | C09D 11/326 428/207 |
| 2012/0034398 A1 | 2/2012 | Wang et al. | |
| 2012/0040148 A1* | 2/2012 | Mozel | B41M 5/0011 428/195.1 |
| 2012/0094210 A1 | 4/2012 | Uensal et al. | |
| 2012/0141212 A1 | 6/2012 | Long | |
| 2012/0148936 A1 | 6/2012 | Uensal et al. | |
| 2012/0196444 A1 | 8/2012 | Lennon et al. | |
| 2012/0219831 A1 | 8/2012 | Mak et al. | |
| 2013/0168254 A1 | 7/2013 | Mitzel et al. | |
| 2013/0260560 A1 | 10/2013 | Mayers et al. | |
| 2013/0303958 A1 | 11/2013 | Holm et al. | |
| 2014/0010975 A1 | 1/2014 | Zhou et al. | |
| 2014/0015894 A1 | 1/2014 | Sisler et al. | |
| 2014/0192112 A1 | 7/2014 | Nagashima et al. | |
| 2014/0192121 A1 | 7/2014 | Bannai et al. | |
| 2014/0199806 A1 | 7/2014 | Lennon et al. | |
| 2014/0232782 A1 | 8/2014 | Mukai et al. | |
| 2015/0009268 A1 | 1/2015 | Sakurada | |
| 2015/0015639 A1 | 1/2015 | Ito et al. | |
| 2015/0166806 A1 | 6/2015 | Kozee et al. | |
| 2015/0284905 A1* | 10/2015 | Mozel | D06P 1/67375 8/457 |
| 2019/0144699 A1 | 5/2019 | Iraqi et al. | |

FOREIGN PATENT DOCUMENTS

| | | |
|---|---|---|
| EP | 3290486 | 3/2018 |
| WO | WO 2010/114560 | 10/2010 |
| WO | WO 2012/134455 | 10/2012 |
| WO | WO 2017/109785 | 6/2017 |
| WO | WO 2017/109786 | 6/2017 |

OTHER PUBLICATIONS

International Preliminary Report on Patentability dated Jul. 5, 2018 From the International Bureau of WIPO Re. Application No. PCT/IL2016/051374. (8 Pages).
International Preliminary Report on Patentability dated Jul. 5, 2018 From the International Bureau of WIPO Re. Application No. PCT/IL2016/051375. (7 Pages).
International Search Report and the Written Opinion dated Mar. 28, 2017 From the International Searching Authority Re. Application No. PCT/IL2016/051374. (12 Pages).
International Search Report and the Written Opinion dated Mar. 30, 2017 From the International Searching Authority Re. Application No. PCT/IL2016/051375. (12 Pages).
Restriction Official Action dated Jul. 30, 2020 from the US Patent and Trademark Office Re. U.S. Appl. No. 16/065,132. (8 pages).

* cited by examiner

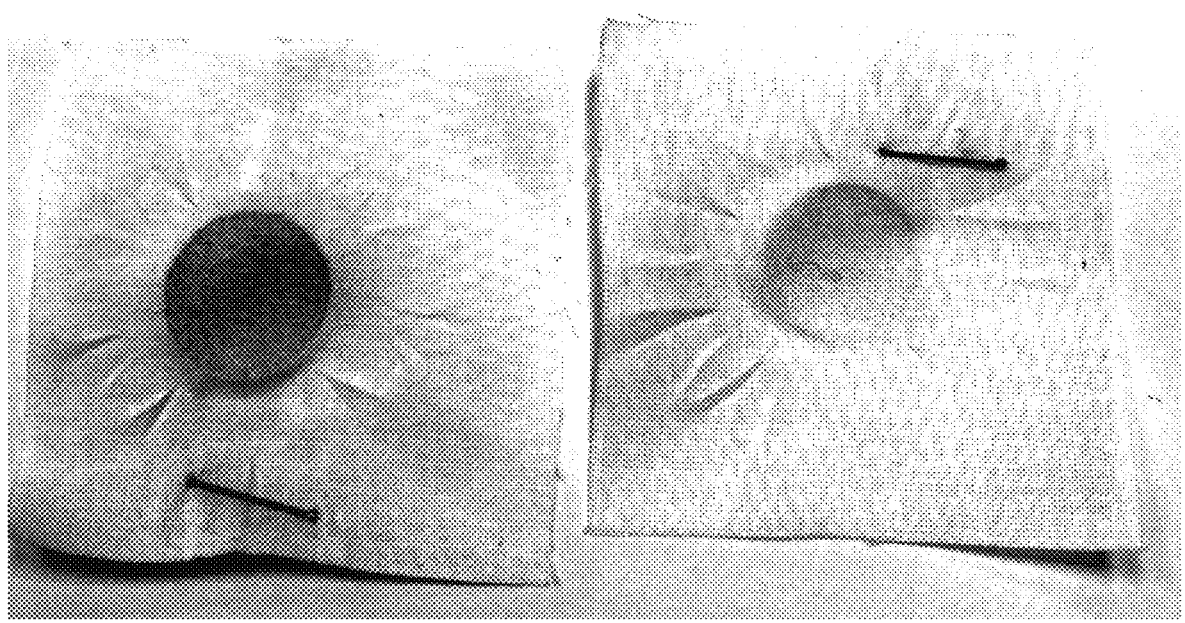

RUB-RESISTANT INKJET COMPOSITION

RELATED APPLICATIONS

This application is a National Phase of PCT Patent Application No. PCT/IL2016/051375 having International filing date of Dec. 22, 2016, which claims the benefit of priority under 35 USC § 119(e) of U.S. Provisional Patent Application No. 62/387,162 filed on Dec. 23, 2015. The contents of the above applications are all incorporated by reference as if fully set forth herein in their entirety.

FIELD AND BACKGROUND OF THE INVENTION

The present invention, in some embodiments thereof, relates to textile printing and, more particularly, but not exclusively, to rub-resistant inkjet compositions and rub-resistant inkjet printing products.

The ever growing demand for new and stimulating garment and fabric fashion, one of the greatest commercial markets, challenges cutting edge technology to innovate in areas such as fiber materials, weaving and threading, cloth fabrication, dying and post treatment of textile fabrics. One approach for increasing textile printing speed, quality, versatility and simplicity involves the use of inkjet printing. Since the introduction thereof in the latter half of the 1980s (see, for example, U.S. Pat. Nos. 4,312,007 and 4,380,770), inkjet printers have grown in availability, performance and popularity while dropping significantly in price, mostly due to their reliability, relatively quiet operation, versatility, graphics capability, print quality, and low cost. Moreover, inkjet printers have made possible "on demand" and "roll-to-roll" color printing without the need for complicated devices.

When the desired substrate for printing is a garment or another textile fabric surface, digital inkjet technology is one of the most favorable technique for designer art and image creation. It is relatively cheap and versatile, yet can provide high resolution multicolor and photorealistic images, as many households experience with their low cost, high resolution inkjet home computer printers. The presently available inks for inkjet printing include nonionic, cationic and anionic aqueous-based inks and non-aqueous solvent-based inks. Aqueous-based inks are typically composed of water and a colorant, usually a dye or a pigment dispersion, and may further contain a number of additives for imparting certain features to the ink (e.g., improved stability and flow, feather resistance, and the like). Non-aqueous solvent-based inks are typically composed of one or more volatile organic solvents, such as low alcohols, glycol ethers, low alkanes and the like, and a colorant.

However, fabrics and other textile substrates present challenges to the inkjet printing technology in that the substrates are typically absorptive, flexible and stretchable, oftentimes colored (non-white), and are used in a variety of dynamic and wearing environments, including activewear and sportswear, repetitive washing, drying and folding, and the like.

Colorfastness is one of the requirements of high quality prints in the textile industry. Colorfastness refers to the durability of an image printed on a fabric and its capacity to withstand fading and crocking under exposure to everyday use of the fabric (washing, drying, wearing and friction with other surfaces), and exposure to various types of conditions, including water, light, rubbing, washing, perspiration etc. to which they are normally exposed in textile manufacturing and in daily use. Colorfastness may be considered in terms of the exposure conditions, such as washing and detergents, water, chlorinated water and sea water, rubbing/crocking, perspiration, light and temperature (pressing).

Factors that affecting the colorfastness properties include, for example, the chemical nature of the fiber constituting the fabric, and the chemical and molecular structure of the image in the form of a film attached to the fabric.

Colorfastness to rubbing, or rub-resistance, is a desired property of many textile products. Polyethylene wax emulsions are used in the textile industry on both natural and synthetic fibers, in order to improve hand-feel and bestow higher rub-resistance to the fabrics. Commercially available rub-resistant waxes are added during fiber production and/or pre- or post-weaving process. Nonionic wax emulsions are generally applied in admixture by padding prior to heat setting, to add softening, improved tear strength, anti-pilling, and reduced needle cutting, due to lower friction. Cationic wax emulsions, due to their substantive nature, can be used as post dye-bath additives for synthetic fibers to impart an antistatic and softening finish.

The need to produce rub-resistant inkjet prints on fabrics that can withstand the wear-and-tear of everyday activities, including repetitive washing and tumble-drying, evoked the use of several ink ingredients that can lower the friction coefficient of the resulting printed image in the form of a film attached to the surface of the substrate. Commercially available water-based flexographic printing systems have been designed for economical printing of, for example, packaging material, disposable paper goods and fabrics. These systems were designed for water-based printing inks, therefore aqueous wax emulsions were required to impart anti-scuff (rub-resistance) properties and anti-blocking properties.

Waxes are commonly used in ink and coatings formulations. They are known to improve various properties such as slip or lubrication, rub or abrasion resistance and anti-blocking. These properties relate to the handling issues that are observed with pigment-based inks. However, these wax emulsions can adversely affect print quality and/or jetting characteristics. Oxidized polyethylene waxes are commercially available and used to rub-resistant agents in the production of fibers and fabrics. Oxidized polyethylene waxes have also been introduced into colored inkjet ink compositions.

U.S. Pat. No. 4,724,002 discloses heat-sensitive transfer media containing an ink composition comprising a binder and a pigment. The binder may be a wax and the pigment may be an oil-based pigment or dry color which is suspended within the binder to impart a color to the ink.

U.S. Pat. No. 3,406,137 discloses a pressure transfer ink formulation comprising a pigment dispersed in a binder. The binder is comprised of waxes, wax soluble dyes, an adhesive resin and polysiloxane.

U.S. Pat. No. 4,762,734 discloses an ink donor film comprising in a hydrocarbon solution of wax components and/or polymer components, or a mixture of wax and polymer components, dispersed in a polar phase containing dispersed pigment or dissolved dye. The coloring agent may include a dye and/or pigment wherein the dye is an alcohol or hydrocarbon-soluble dye.

U.S. Pat. Nos. 4,390,369 and 4,484,948 disclose a natural-wax ink jet ink containing at least one natural wax. The wax may be used as a basic fluid vehicle or as an additive to other fluid vehicles. A coloring agent or dye such as an oil or solvent dye may be added to the composition.

U.S. Pat. No. 4,636,258 discloses an ink composition comprising a copolymer, a colorant dispersed therein, and wax or resin. The wax may be added to the colorant when dispersed in the copolymer.

U.S. Pat. No. 4,878,946 discloses a hot melt ink for thermal ink-jet printers comprising an oil-soluble dye and additives dissolved in at least one compound that is solid at ambient temperature.

U.S. Pat. No. 3,353,974 discloses a homogeneous composition for printing inks and various coatings comprising an oil, wax and/or resinous base, and a high concentration of dispersed pigments.

Additional background art include U.S. Pat. Nos. 4,060,569, 4,698,450, 4,820,876, 5,023,388, 5,709,976.

SUMMARY OF THE INVENTION

Embodiments of the present invention relate to an ink-immobilizing composition containing wax particles in a colloid, that is capable of causing immobilization of an ink composition upon contact on the surface of a substrate, thereby mitigating the problems associated with ink bleeding and at the same time providing the finished image the advantages of the wax, such as rub-resistance, improved washfastness and improved hand-feel.

According to an aspect of some embodiments of the invention, there is provided an immobilizing composition that includes a plurality of wax particles, a surfactant, a property-adjusting agent and an immobilizing composition carrier, and being capable of causing immobilization of an ink composition upon contacting the ink composition, the ink composition comprises a colorant, a property-sensitive agent and an ink composition carrier.

Provided is an immobilizing composition that includes a plurality of wax particles, a surfactant, a property-adjusting agent and an immobilizing composition carrier, wherein the property-adjusting agent lowers a pH level at a surface of a substrate thereby effecting immobilization of an ink composition upon contacting the ink composition with the immobilizing composition on the surface.

The immobilizing composition includes a property-adjusting agent in the form of an acid and a carrier, and is capable of causing immobilization of an ink composition upon contact when the ink composition includes a property-sensitive agent, a colorant and a carrier.

In some embodiments, contact between the immobilizing composition and the ink composition takes place on the surface of a substrate.

In some embodiments, the immobilizing composition is having a pH that ranges from about 3 to about 6.

In some embodiments, the average size of the wax particles ranges from 0.1 microns to 10 microns.

In some embodiments, the solid contents of the wax particles in the composition ranges from 0.1% to 4% based on the total weight of the composition.

In some embodiments, the immobilizing composition is substantially devoid of a colorant.

In some embodiments, the immobilizing composition is colorless and designed to impart no color on the substrate.

In some embodiments, the immobilizing composition is suitable for direct inkjet printing.

In some embodiments, the immobilizing composition is suitable for direct digital printing from a spray nozzle.

In some embodiments, the immobilizing composition is suitable for direct digital printing from an inkjet printhead.

In some embodiments, the immobilizing composition is designed for application from a nozzle is characterized by at least one of:
a maximal particle size of less than 15 micron;
a dynamic viscosity at shear that ranges from 2 to 4 $(N \cdot s)/m^2$;
a room temperature Brookfield viscosity less than 3 centipoises;
a surface tension that ranges from 24 to 26 N/m; and
an electrical resistance of 50 to 2000 ohm per centimeter.

In some embodiments, the immobilizing composition is designed for application from a printhead is characterized by at least one of:
a maximal particle size of less than 10 microns;
a dynamic viscosity at shear that ranges from 8 to 20 $(N \cdot s)/m^2$;
a room temperature Brookfield viscosity less than 25 centipoises;
a surface tension that ranges from 24 to 32 N/m; and
an electrical resistance of 50 to 2000 ohm per centimeter.

In some embodiments, the wax particles in the composition are in the form of a colloid.

In some embodiments, the colloid-stabilizing surfactant in the immobilizing composition is selected from the group consisting of a cationic surfactant, an anionic surfactant and a nonionic surfactant.

In some embodiments, the colloid-stabilizing surfactant in the immobilizing composition is a cationic surfactant.

In some embodiments, the colloid-stabilizing surfactant in the immobilizing composition is present in the composition in an amount that ranges from 30 to 60 percent of the total weight of the plurality of wax particles in the composition.

In some embodiments, the colloid-stabilizing surfactant in the immobilizing composition is present in the composition in an amount that ranges from 0.01 to 0.1 percent of the total weight of the composition.

In some embodiments, the wax is selected from the group consisting of a low density polyethylene (LDPE) wax, a high density polyethylene (HDPE) wax, an oxidized polyethylene wax, an ethylene copolymer wax, a polyethylene copolymer wax, a low density polypropylene wax, a high density polypropylene wax, an oxidized polypropylene wax, an propylene copolymer wax, a polypropylene copolymer wax, a paraffin wax, a polytetrafluoroethylene (PTFE) modified polyethylene wax, an aliphatic ester wax and any combination thereof.

In some embodiments, the wax is an oxidized polyethylene wax.

In some embodiments, the immobilizing composition is having a pH that ranges from about 3 to about 6, wherein the wax is an oxidized polyethylene wax and the colloid-stabilizing surfactant is a cationic surfactant.

In some embodiments, the property-adjusting agent in the immobilizing composition is selected from the group consisting of an acid, a base, a salt, a charged polymer and a metal oxide.

In some embodiments, the property-adjusting agent in the immobilizing composition is an acid.

In some embodiments, the acid in the immobilizing composition is an organic acid.

In some embodiments, the organic acid in the immobilizing composition is selected from the group consisting of a carboxylic acid, carbonic acid, formic acid, acetic acid, propionic acid, butanoic acid, an α-hydroxy acid, glycolic acid, lactic acid, any halogenated derivative thereof and any combination thereof.

In some embodiments, the acid in the immobilizing composition is a transitory acid. In some embodiments, the acid is volatile, degradable or transformable to a neutral species. In some embodiments, the acid is volatile by heat, degradable by heat or transformable to a neutral species by heat.

In some embodiments, the property-sensitive agent in the ink composition is in a form of a dispersed agent and/or emulsified agent.

In some embodiments, the property-sensitive agent in the ink composition is selected from the group consisting of a resin binder, a dispersing agent, an adhesion promoting agent and a film-forming agent.

The property-adjusting agent in the immobilizing composition presented herein interacts with a property-sensitive agent, thereby effecting congelation or coagulation of an ink composition comprising the same. In some embodiments, the property-sensitive agent in the ink composition is an emulsified and/or dispersed resin or polymer, selected from the group consisting of a polyacrylate, a polyurethane, a polyether, a polyoxyethylene, a polyester, a polyvinyl chloride, a polyvinyl acetate, a polyvinyl butyral, an aminosilicon and any salt or combination thereof.

In some embodiments, the property-sensitive agent in the ink composition is a dispersing agent.

In some embodiments, the property-sensitive agent in the ink composition is a resin binder.

In some embodiments, the property-sensitive agent in the ink composition is a film-forming agent.

In some embodiments, the carried in the immobilizing composition is an aqueous carrier.

In some embodiments, the carried in the ink composition is an aqueous carrier.

According to an aspect of some embodiments of the invention, there is provided an inkjet printing kit that includes a wax-containing immobilizing composition as presented herein, and the ink composition as presented herein.

In some embodiments, each of the immobilizing composition and the ink composition in the kit are packaged separately in a packaging material.

In some embodiments, the immobilizing composition in the kit is identified in print, in or on the packaging material, for use in coagulating the ink composition in the kit upon contacting the ink composition.

According to an aspect of some embodiments of the present invention, there is provided a process of printing an image on a substrate; the process is carried out by contacting at least a portion of the substrate with the wax-containing immobilizing composition presented herein, and applying the ink composition, as presented herein, on the portion of the substrate, thereby printing the image.

In some embodiments of the process, the immobilizing composition and the ink composition are each individually applied on the portion of the substrate by a separate applicator.

In some embodiments of the process, the immobilizing composition is applied by a nozzle and/or a printhead.

In some embodiments of the process, the ink composition is applied by an inkjet printhead.

In some embodiments of the process, the immobilizing composition and the ink composition are applied concertedly, concomitantly or sequentially.

In some embodiments of the process, the immobilizing composition is applied in-line with the ink composition.

In some embodiments of the process, the ink composition is applied on the substrate while the substrate is still wet with the immobilizing composition.

In some embodiments, the process further includes curing the image subsequent to the applying the ink composition.

According to an aspect of some embodiments of the present invention, there is provided a substrate having an image printed thereon according to the process presented herein, wherein the image is in the form of a film attached to the substrate and the film is formed by contacting the substrate with the wax-containing immobilizing composition presented herein, and applying the ink composition presented herein on the substrate, thereby forming the image.

In some embodiments, the film is characterized by an improvement of colorfastness to rubbing of at least 50% as determined according to an AATCC 8 colorfastness to rubbing test compared to a film formed without wax.

In some embodiments, the film is characterized by an improved hand-feel compared to a film formed without wax.

In some embodiments, the film is characterized by an improved washfastness, expressed by color intensity after 5 wash cycles at 40° C. and wringing at 1000 rpm compared to a film formed without wax.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF SEVERAL VIEWS OF THE DRAWINGS

Some embodiments of the invention are herein described, by way of example only, with reference to the accompanying images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 presents a photograph, rendered in greyscale, of two pieces of white cloth used in the colorfastness to rub tests which were conducted on a cyan image, wherein the right-hand sample is the test cloth used on an image printed using a wax-containing immobilizing composition, according to embodiments of the present invention, and the left-hand sample is a similar test cloth used on an image printed using an immobilizing composition devoid of wax.

DESCRIPTION OF SPECIFIC EMBODIMENTS OF THE INVENTION

The present invention, in some embodiments thereof, relates to textile printing and, more particularly, but not exclusively, to rub-resistant inkjet compositions and rub-resistant inkjet printing products.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As mentioned hereinabove, waxes have been incorporated into fabrics, fabric coatings and ink compositions, including inkjet formulations, in order to modify the rheology of the liquid ink or to bestow physical prophesies to the finished printed film. When added to inks, wax emulsions are known to improve film forming, lubricity, stitching speed, anti-scuff, durability and toughness of the substrate and anti-blocking (coat to coat adhesion reduction).

Adding wax emulsions to ink compositions which carry the colorant to the substrate, require selecting waxes that are suitable for admixing with the ingredients in the colored ink composition and adapt to the ionic contents and pH (typically alkaline) thereof, and which will not interfere with inkjet printing machinery. Since colored ink compositions vary in chemical composition, there is no single wax formulation that suits all the range of chemistries, pH, surfactants, particle sizes etc., rendering the use of wax costly and wasteful. Thus, the approach of adding wax emulsions to ink compositions which carry the colorant suffers from several disadvantages, such as:

1. Only the part of the substrate that is directly under the printed image receives the wax emulsion
3. Each colored ink formulation may require a different wax;
2. Wax emulsions interfere with some ink formulation; and
3. Some inkjet printheads are incompatible with wax emulsions.

While searching for a solution for the use of waxes which are suitable for a wider range of ink compositions, such as the use of cationic waxes for use with basic ink compositions, the present inventors have contemplated altering the use of the wax altogether and placing it in a separate composition, namely a composition which is not the colored composition comprising a colorant. While reducing the present invention to practice, it was surprisingly found that adding a wax, such as oxidized polyethylene wax, to a non-colored acidic composition, and applying that non-colored acidic composition (referred to herein as immobilizing composition) essentially concomitantly with an acid-sensitive colored ink composition, allows not only the introduction of the rub-resistant wax to the resulting film, but also the immobilization (by, e.g., coagulation) of the acid-sensitive colored ink composition on the surface of the substrate.

The presently provided wax-containing immobilizing compositions were found useful in improving wash-fastness, rub-resistance and general mechanical permanence of printed substrates made from natural or synthetic fibers, such as polyester textiles. The use of the presently provided wax-containing immobilizing compositions also reduced substrate dye migration of printed colored polyester textiles. In addition to the above benefits, the introduction of wax to the immobilizing compositions also improved the anti-scuff and hand-feel properties, color stability, gloss, anti-blocking in print-to-print stacking, waterproofing, sewing/stitching-lubricity and slip properties of the printed substrates.

Wax-Containing Immobilizing Composition:

Adding the wax to the immobilizing composition rather than to the ink composition has been found beneficial for other aspects, such as the more versatile range of inks that can be used when not having to include a wax, the wider range of wax types (e.g., particle size and solid contents) that can be used when placed in the immobilizing composition rather than in the ink composition, the wider range of apparatus that can be used to dispense the immobilizing and inks compositions (nozzles versus the more sensitive and expensive printheads), the broader area of the substrate receiving the wax-containing composition, and other practical and economic benefits.

Thus, according to an aspect of some embodiments of the present invention, there is provided an ink immobilizing composition that includes a plurality of wax particles suspended in the composition, a surfactant (a surface-active agent), a property-adjusting agent and a carrier. According to embodiments of the present invention, the immobilizing composition containing the wax (wax-containing immobilizing composition) is capable of causing a change in an ink composition that leads to the immobilization of the ink composition that includes a colorant, a property-sensitive agent and a carrier, whereas the immobilization of the ink droplets is effected upon contacting the two compositions, as discussed in detail hereinbelow.

Briefly, the immobilization of the ink composition is generally effected on at least a portion of a surface of a substrate with the aim of limiting or arresting soaking, spreading and feathering of the ink composition in/on the surface of the substrate, particularly when inkjet-printing the ink composition on an absorptive substrate such as textile. The inclusion of a wax in the immobilizing composition further assists in modifying the surface-tension of the composition such that the composition is less prone to soaking into, or spreading onto the substrate, and providing the finished and cured printed image, in the form of a film, improved rub-resistance properties. According to some embodiments of the present invention, the substrate is a textile substrate, such as a woven or non-woven fabric, a cloth, a garment and/or a piece of clothing.

Quantitatively, "immobilization" in the context of embodiment of the present invention is defined as elevating the viscosity of the color-bearing ink composition by 10-folds, 50-folds, 100-folds, 500-folds 1000-folds or 2000-folds and more. For example, when a given color-bearing ink composition is characterized by having a viscosity of 10-13 cp, it is defined as immobilized when its viscosity is elevated to about 2000 cp or higher as a result of congelation. In some embodiments, the term "immobilization" is used to refer to a sharp increase in viscosity of a liquid, such that droplets of the liquid are less prone to flow, soaking, bleeding, spreading and feathering.

Hence the chemical and/or physical change, which affects the droplets of liquid ink composition, according to some embodiments of the present invention, is generally referred to herein as "immobilization". In the context of the chemical and mechanical change that occurs in the ink composition, according to some embodiments of the present invention, the term "immobilization", as used herein, is interchangeable the terms "coagulation", "congelation", "flocculation", "precipitation", "thickening" or "gelation", and refer to the sharp decrease in fluidity of a formerly fluid liquid. Coagulation can be effected also by, or seen as sedimentation, precipitation, partial solidification and partial polymerization of soluble constituents in the composition. The term "sedimentation", as used herein, refers to the destabilization of suspended colloidal or emulsified substances, such as pigment particles. The term "flocculation", as used herein, refers to the bridging between particles by a polymer chain, causing them to form flocs or larger aggregates that might sediment or precipitate.

According to some embodiments of the present invention, the wax-containing immobilizing composition is formulated to carry and deliver a wax and a property-adjusting agent, and does not contain a colorant and is thus substantially transparent and colorless, and intended not to leave a distinguishable mark on the substrate. Thus, according to some embodiments of the present invention, the wax-containing immobilizing composition is essentially devoid of a colorant.

The term "colorant", as used herein, describes a substance which imparts the desired color to the printed image. The colorant may be a pigment or a dye. Pigments are solid colorants with are typically suspended in the carrier of the ink composition as dispersed particles, whereby dyes are colorants which are dissolved in the carrier of the ink composition. Some dyes may be insoluble liquids which form emulsions with the carrier.

The wax-containing immobilizing composition presented herein is formulated so as to be suitable for application thereof in-line of an inkjet printing process. In other words, the immobilizing composition is designed to be applied directly on the substrate as part of the printing process rather than a pre-treatment step before the printing process, which can take place off-line of the inkjet printing process. Such formulation incurs some limitations of the immobilizing composition, particularly in the sense that the composition is required to be suitable for inkjet applicators that form a part of the inkjet machinery, and particularly the parts that involve direct inkjet printing.

The mechanical properties of the wax-containing immobilizing composition presented herein are correlated, at least to some extent, to the properties of the liquid applicator used to apply the composition on the substrate. Suitable applicators include high-output capacity spray nozzles that are typically used to cover relatively large area of the substrate at relatively low resolution, and inkjet printheads, the latter being more delicate and complex and used for accurate drop placement (high resolution) at relatively low-output capacity. For simplicity, the term "nozzle" is used herein to refer to the high-output low resolution liquid applicator, and the term "printhead" is used to refer to the low-output high resolution liquid applicator. Output capacity may also be affected by the relative speed by which the applicator moves over the substrate (or the substrate moves under the applicator) during the printing process, however the output capacity is determined while taking that relative motion into account by reporting the total amount of liquid that is being delivered to a unit area at a unit time. A typical printhead delivers ink according to the varied digitized color requirements at any given image segment ("pixel"), pallet motion and printhead frequency, while a typical spray nozzle delivers constant amount under constant pressure of liquid over time, varied by pallet motion. For an exemplary comparison, a spray output capacity of a nozzle ranges about 4-5 grams per square inch at a pressure of about 1.5 bar, while the jetting output capacity of a printhead ranges about 0.02-0.05 grams per square inch.

According to some embodiments, when the wax-containing immobilizing composition is designed to be applied (sprayed) by a nozzle, the wax and other components are selected and/or treated such that the composition exhibits (characterized by) at least one of the following attributes:

a dynamic viscosity at shear that ranges from 2 to 4 $(N \cdot s)/m^2$;

a room temperature Brookfield viscosity less than 3 centipoises;

a surface tension that ranges from 24 to 26 N/m; and an electrical resistance of 50 to 2000 ohm per centimeter.

According to some embodiments, when the wax-containing immobilizing composition is designed to be applied (jetted) by a printhead, the wax and other components are selected and/or treated such that the composition exhibits (characterized by) at least one of the following attributes:

a dynamic viscosity at shear that ranges from 8 to 20 $(N \cdot s)/m^2$;

a room temperature Brookfield viscosity less than 25 centipoises;

a surface tension that ranges from 24 to 32 N/m; and an electrical resistance of 50 to 2000 ohm per centimeter.

According to some embodiments of the present invention, the wax-containing immobilizing composition is a water-based composition, and the immobilizing composition carrier is an aqueous carrier, or water.

Wax:

Wax is typically a thermoplastic organic substance, is synthetic and/or naturally occurring source, which is malleable near ambient temperature.

In some embodiments, the wax used herein may have a molecular weight (Mw, as measured by, for example, Gel Permeation Chromatography) ranging from about 300 to about 5000, or from about 400 to about 4000, or from about 500 to about 3000.

Suitable wax materials, according to some embodiments of the present invention, include homopolymers, oxidized homopolymers, copolymers, oxidized copolymers, polyolefins, paraffins, oxidized polyolefins poly-α-olefins, oxidized poly-α-olefins, ester-based waxes, polytetrafluoroethylene (PTFE) modified polyethylene waxes and mixtures thereof.

Waxes that may be used in the context of some embodiments of the present invention include, polyolefins such as polyethylene, polypropylene, and polybutene waxes such as commercially available from Allied Chemical and Petrolite Corporation, for example POLYWAX™ like including POLYWAX® 2000, POLYWAX® 1000, POLYWAX® 500, and the like from Baker Petrolite, Inc.; oxidized waxes such as X-2073 and Mekon waxes, from Baker-Hughes Inc.; polyethylene waxes such as from Baker Petrolite, wax dispersions available from BASF such as Joncryl wax 4, Joncryl wax 26, Joncyrl wax 28 and Joncryl wax 120 and from Michaelman, Inc. and the Daniels Products Company, EPOLENE N-15™ commercially available from Eastman Chemical Products, Inc., and VISCOL 550-P™; plant-based waxes, such as carnauba wax, rice wax, maydelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropschwax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate; and cholesterol higher fatty acid ester waxes, such as cholesteryl stearate.

Additional commercially available micronized (particulated) waxes include CERAFLOUR® 932 G, CERA- FLOUR® 950, CERAFLOUR® 962, CERAFLOUR® 969, CERAFLOUR® 993 and the like, provided by BYK company.

Examples of functionalized waxes that may be used include amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer dispersion, for example JONCRYL 74™, 89™, 130™, 537", and 538™, all available from BASF, and chlorinated polypropylenes and polyethylenes available from Allied Chemical and Petrolite Corporation and SC Johnson wax; and combinations thereof. Other suitable additives or materials as known to one of ordinary skill in the art may also be included in the wax dispersion.

According to some embodiments of the present invention, suitable wax material is selected from the family of polyethylene waxes. Suitable polyethylene wax materials are homopolymers of ethylene or copolymers of ethylene with one or more α-olefins. α-Olefins used are linear or branched olefins having 3-18 carbon atoms. Examples of such olefins are propene, 1-butene, 1-hexene, 1-octene or 1-octadecene, also styrene. According to some embodiments of the present invention, polyethylene wax materials include ethylene homopolymers and copolymers of ethylene with propene or 1-butene. The copolymers comprise 50-99.9% ethylene by weight, or 60-99.9% ethylene, 70-99.9% ethylene or 80-99% ethylene by weight of the total weight of the wax material.

According to some embodiments of the present invention, suitable wax material is selected from the family of oxidized or partially oxidized polyethylene waxes (see, Scheme 1 below). Oxidized polyethylene waxes can be produced from polyethylene waxes according to procedures known in the art, such as, for example, the method provided in U.S. Pat. No. 6,211,303.

Scheme 1

$$\left(\begin{array}{c}\end{array}\right)_x \left(\begin{array}{c} \\ R \end{array}\right)_y$$

R = H or OH or * = O $$\text{or } * \overset{O}{\underset{}{\bigwedge}} OH$$

In some embodiments, the wax may be in a form of fine particles (or powder) or in dispersions and colloids having an average particle size ranging from about 10 nanometers to about 50 microns, or from about 10 nanometers to about 10 microns, or from about 50 nanometers to about 5 microns, or from about 100 nanometers to about 2 microns, or from about 200 nanometers to about 1 micron. According to some embodiments of the present invention, the average size of the wax particles in the wax-containing containing immobilizing compositions (colloids) ranges from 10 nm to 10 μm in average diameter. According to some embodiments, the average particle size of the wax material in the wax colloid is less than 100 nm, less than 200 nm, less than 300 nm, less than 400 nm, less than 500 nm, less than 600 nm, less than 700 nm, less than 800 nm, less than 900 nm, less than 1 μm, less than 2 μm, less than 3 μm, less than 4 μm, less than 5 μm, less than 6 μm, less than 7 μm, less than 8 μm, less than 9 μm or less than 10 μm. In some embodiments of the invention, the average size of the wax particles in the wax-containing immobilizing composition ranges from about 1 micron to about 15 microns.

When applied from a nozzle, the maximal average size of the wax particles is less limited than when applied from a printhead, since the ejecting orifice of a nozzle is larger than the orifice of a printhead, whereas the nozzle's orifice, designed to operate at a flowrate of 1.5 bar and spray about 4-5 ml/sec, is about 0.2-0.5 mm, and the orifice of a printhead is about 35-50 microns (μm) in some embodiments, and 8-10 microns in diameter in other embodiments.

Hence, according to some embodiments, when indented for application from a nozzle, the average size of the wax particles in the wax-containing immobilizing composition ranges from about 10 nanometers to about 15 microns, or about 300 nm to 3 microns, or about 5-10 microns, or about 1-6 microns, or about 9-15 microns; and when indented for application from a printhead, the average size of the wax particles in the wax-containing immobilizing composition ranges from about 10 nanometers to about 10 microns, or about 10-500 nm, or about 50-5000 nm, or about 50-10000 nm.

According to some embodiments, the maximal particle size of the wax particles in the wax-containing immobilizing composition is less than 15 microns when sprayed from a nozzle, and less than 10 microns when jetted from a printhead.

Another consideration is selecting the wax particle size is the way the particles are positioned in the film of the image, wherein the film is about 2-5 microns in thickness.

Wax Colloid:

Most waxes are insoluble in water but soluble in organic, nonpolar solvents. One way of introducing water immiscible wax materials into aqueous medium-based compositions, is by forming aqueous wax colloids. In a colloid, the wax droplets or particles are small enough to exhibit Brownian motion.

It is noted that the presently provided wax-containing immobilizing compositions can be seen as colloids. In general, a colloid is a substance in which microscopic particles are dispersed in a liquid medium, but are not dissolved therein. If left undisturbed, the colloid will not settle substantially to form a sediment. An emulsion is a particular type of colloid, referring to microscopic particles of liquid dispersed in another liquid. A suspension is similar to a colloid except that the dispersed particles tend to be larger and will eventually settle or form sediment. In the context of embodiments of the present invention, the terms colloid, emulsion and suspension are interchangeable unless stated otherwise. According to some embodiments, the presently disclosed wax-containing immobilizing compositions are wax colloids.

In embodiments, the wax-containing immobilizing composition may include one or more wax dispersions (solids contents) in a total amount from about 0.1% to about 5% of the total weight of the composition, or 0.5-5%, or 0.1-4%, or 0.5-4%, or 0.5-3%, or 1-4%, or 1-3%, or 1-2% solids contents of the total weight of the composition. If one or more wax dispersions (wax materials) is utilized, each wax dispersions may be present in any ratio between 0 and 100% comprising the blend as long as the total amount of the wax dispersion in the immobilizing composition is within the desired range.

In the context of some embodiments of the present invention, wax particles can be introduced into the wax-containing ink immobilizing composition by mixing a stock wax colloid and an immobilizing composition carrier. Waxes that are useful in the context of some embodiments of the present invention are typically two-phase colloidal dispersion including a solid wax material suspended in water with appropriate surfactants, protective colloids, etc.

The stock wax colloid comprises suspended wax particles at a concentration that ranges from about 10 to about 60 percent non-volatile matter or solids of the total weight of the stock colloid, or from about 10 percent to about 40 percent, or from about 25 percent to about 35 percent by total weight of the stock wax colloid.

An exemplary stock wax colloid may include:

| Micronized wax particles | 30-50% (w/w) |
|---|---|
| Surfactant | 12-20% (w/stock weight) |
| Deionized water QS to | 100% |

U.S. Pat. No. 1,831,544 teaches a process for the preparation of a wax colloid, which can generally be used to prepare wax colloids stock. Another source of information regarding colloidal wax preparations can be found, for example, in Ivanovszky, L., *J. Polym. Sci.*, 1962, 58, pages 273-288.

In some embodiments of the present invention, suitable wax colloids include, but are not limited to, oxidized polyethylene wax (CAS No. 68441-17-8) colloids having an average particle size of about 0.2 to 0.8 micron in diameter, a cationic surfactant and a pH that ranges from 3-6. Other commercially available wax colloids stock products include oxidized polyethylene wax Lakewax® C60 (by Lakeland), paraffinic cationic wax Qualiwax® C-40 (by Quality Chem. Industries), micronized polyethylene wax M3310 (by Marcus Oil & Chemicals), and paraffinic wax Aquacer® 497 (by BYK Chemie).

Surfactant:

The wax particles are typically suspended (stabilized) in the colloidal state by means of a dispersing agent, also referred to herein interchangeably as a surfactant or a surface-active agent, which stabilizes the colloids in terms of the particles capacity to stay dispersed and suspended in a liquid medium.

Surfactants may act as buffering agents, detergents, wetting agents, emulsifiers and dispersants. Surfactants are classified into families according to the charge or polarity of their head-group, namely into anionic, non-ionic and cationic surfactants. A nonionic surfactant has no charged groups in its head. The head of an ionic surfactant carries a net positive, or negative charge. If the charge is negative, the surfactant is more specifically called anionic; if the charge is positive, it is called cationic. If a surfactant contains a head with two oppositely charged groups, it is termed zwitterionic. In the context of embodiments of the present invention, the wax-containing immobilizing composition may include anionic surfactants, nonionic surfactants, silicone surfactants, fluorosurfactants and combinations thereof.

In accordance with the present invention, suitable wax colloids include nonionic, anionic and cationic wax colloids. In general, nonionic wax colloids are stabilized using nonionic surfactants, cationic wax colloids are stabilized using cationic surfactants, and anionic wax colloids are stabilized using anionic surfactants. In the context of embodiments of the present invention, wax colloids are stable in acidic (pH<7) conditions, regardless of the nature of the surfactant.

According to some embodiments of the present invention, the wax colloid is stabilized by cationic surfactants and is stable in acidic conditions. According to some embodiments of the present invention, the wax colloid is acidic.

In some embodiments of the present invention, the surfactant is a cationic surfactant. Most cationic surfactants can be broadly described as the water-soluble salts of primary, secondary, or tertiary amines, having in their molecular structure an alkyl radical containing from about 8 to about 22 carbon, including acyl radicals. Optionally, according to some embodiments of the present invention, cationic surfactants are defined as polyoxyalkylenated primary, secondary or tertiary fatty amine salts, quaternary ammonium salts, and mixtures thereof.

Typically, the fatty radical of a cationic surfactant can be a linear or branched aliphatic radical containing from 1 to 30 carbon atoms, or an aromatic radical such as aryl or alkylaryl. The aliphatic radicals may comprise hetero atoms such as, especially, oxygen, nitrogen, sulfur and halogens. The aliphatic radicals are chosen, for example, from $C_{10-30}$ alkyl, $C_{10-30}$ alkoxy, $C_{10-30}$ polyoxyalkylene, $C_{10-30}$ alkylamide, $(C_{10-30})$ alkylamido$(C_2-C_6)$alkyl, $(C_{10-30})$alkylacetate and $C_{10-30}$ hydroxyalkyl radicals, typically accompanied by an anion chosen from the group of halides, phosphates, acetates, lactates, $(C_{2-6})$alkyl sulfates and alkyl- or alkylarylsulfonates.

Cationic surfactants based on quaternary ammonium salts include, for example, tetraalkylammonium chlorides, for instance dialkyldimethylammonium or alkyltrimethylammonium chlorides in which the alkyl radical contains from about 12-22 carbon atoms, behenyltrimethylammonium chloride, distearyldimethylammonium chloride, cetyltrimethylammonium chloride or benzyldimethylstearylammonium chloride, or, palmitylamidopropyltrimethylammonium chloride or stearamidopropyldimethyl(myristyl acetate)ammonium chloride, sold under the name Ceraphyl® 70.

Cationic surfactants based on ammonium salts containing at least one ester function include, for example, salts (especially chloride or methyl sulfate) of diacyloxyethyl-dimethylammonium, of diacyloxyethyl-hydroxyethylmethylammonium, of monoacyloxyethyl-dihydroxyethylmethylammonium, of triacyloxyethyl-methylammonium, of monoacyloxyethyl-hydroxyethyl-dimethylammonium, and mixtures thereof. The acyl radicals may contain 10-30 carbon atoms and may be derived from a plant oil, for instance palm oil or sunflower oil. When the surfactant contains several acyl radicals, these radicals may be identical or different.

Cationic surfactants may be obtained, for example, by direct esterification of optionally oxyalkylenated triethanolamine, triisopropanolamine, alkyldiethanolamine or alkyldiisopropanolamine onto fatty acids or onto mixtures of fatty acids of plant or animal origin, or by transesterification of the methyl esters thereof. This esterification is followed by a quaternization using an alkylating agent such as an alkyl halide (preferably a methyl or ethyl halide), a dialkyl sulfate (preferably dimethyl or diethyl sulfate), methyl methanesulfonate, methyl para-toluenesulfonate, glycol chlorohydrin or glycerol chlorohydrin.

Some cationic surfactants are sold, for example, under the names Dehyquart® by the company Henkel, Stepanquat® by the company Stepan, Noxamium® by the company Ceca, and Rewoquat® WE 18 by the company Rewo-Witco.

Some cationic surfactants contain a mixture of quaternary ammonium mono-, di- and triester salts with a weight majority of diester salts.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride or other halides, cetrimonium bromide and other halides, alkyl benzyl dimethyl ammonium bromide, benzalkonium chloride, benzethonium chloride, bronidox, olaflur, tetramethylammonium hydroxide, distearyldimethylammonium chloride or other halides, cetyl pyridinium bromide, $C_{10-20}$ trimethyl ammonium bromides and other halides, halide salts of quaternized polyoxyethylalkylamines, dodecylbenzyl triethyl ammonium chloride, MIRAPOL™ and ALKA-QUAT™ available from Alkaril Chemical Company, SANIZOL™ (benzalkonium chloride) available from Kao Chemicals, and the like, and mixtures thereof. A suitable amount of surfactant can be selected, such as from about 0.2 to about 5 percent by weight of the toner components. The cationic surfactant selected for the wax dispersion and the second surfactant can be the same or different.

In some embodiments of the present invention, the surfactant is an anionic surfactant. Most anionic surfactants can be broadly described as the water-soluble salts, particularly the alkaline earth metal, ammonium and amine salts, of organic sulfuric reaction products having in their molecular structure an alkyl radical containing from about 8 to about 22 carbon atoms and a radical selected from the group consisting of sulfonic acid and sulfuric acid ester radicals. Included in the term alkyl is the alkyl portion of acyl radicals. Examples of the anionic synthetic surfactants which can be used as the surfactant component in the immobilizing compositions, according to some embodiments of the present invention, are the ammonium, or magnesium alkyl sulfates, especially those obtained by sulfating the higher alcohols ($C_{8-18}$ carbon atoms); magnesium alkyl benzene or alkyl toluene sulfonates, in which the alkyl group contains from about 9 to about 15 carbon atoms, the alkyl radical being either a straight or branched sodium and potassium sulfates can be incorporated; sodium or magnesium paraffin sulfonates and olefin sulfonates in which the alkyl or alkenyl group contains from about 10 to about 20 carbon atoms; sodium $C_{10-20}$ alkyl glyceryl ether sulfonates, especially those ethers of alcohols derived from tallow and coconut oil; sodium coconut oil fatty acid monoglyceride sulfates and sulfonates; sodium, ammonium or magnesium salts of alkyl phenol ethylene oxide ether sulfates with about 1 to about 30 units of ethylene oxide per molecule and in which the alkyl radicals contain from 8 to about 12 carbon atoms; the reaction products of fatty acids esterified with isethionic acid and neutralized with suitable base where, for example, the fatty acids are derived from coconut oil; sodium or potassium salts of fatty acid amides of a methyl tauride in which the fatty acids, for example, are derived from coconut oil and sodium or potassium beta-acetoxy- or beta-acetamido-alkanesulfonates where the alkane has from 8 to 22 carbon atoms. It is noted herein that when using anionic surfactants from various sources, care should be taken to avoid production of alkali bases, as those may stain/burn the fabric.

Examples of alkyl sulfate salts, which can be employed in the immobilizing composition, according to some embodiments of the present invention, include sodium lauryl alkyl sulfate, sodium palmityl alkyl sulfate, sodium decyl sulfate, sodium myristyl alkyl sulfate, potassium lauryl alkyl sulfate, potassium decyl sulfate, potassium palmityl alkyl sulfate, potassium myristyl alkyl sulfate, sodium dodecyl sulfate, magnesium dodecyl sulfate, sodium coconut alkyl sulfate, potassium coconut alkyl sulfate, magnesium $C_{12-15}$ alkyl sulfate and mixtures of these surfactants. Preferred alkyl sulfates include sodium $C_{12-15}$ alkyl sulfate and magnesium $C_{12-15}$ alkyl sulfate.

Examples of alkylbenzene or alkyltoluene sulfonates, which can be employed as surfactants in the immobilizing composition, according to some embodiments of the present invention, include the alkaline earth (calcium, magnesium) ammonium and alkanolamine salts of straight- or branched-chain alkylbenzene or alkyltoluene sulfonic acids. Alkylbenzene sulfonic acids useful as precursors for these surfactants include decyl benzene sulfonic acid, undecyl benzene sulfonic acid, dodecyl benzene sulfonic acid, tridecyl benzene sulfonic acid, tetrapropylene benzene sulfonic acid and mixtures thereof. Preferred sulfonic acids as precursors of the alkyl-benzene sulfonates useful for compositions herein are those in which the alkyl chain is linear and averages about 11 to 13 carbon atoms in length. Examples of commercially available alkyl benzene sulfonic acids useful in the present invention include Conoco SA 515 and SA 597 marketed by the Continental Oil Company and Calsoft LAS 99 marketed by the Pilot Chemical Company.

Preferred anionic surfactants, which can be employed in the immobilizing composition, according to some embodiments of the present invention, include alkyl ether sulfates having the formula $RO(C_2H_4O)nSO_3M$ wherein R is alkyl or alkenyl of about 10 to about 20 carbon atoms, n is an integer ranging from 1 to 30, and M is a water-soluble cation. The alkyl ether sulfates useful as surfactants in the immobilizing composition, according to some embodiments of the present invention, are condensation products of ethylene oxide and monohydric alcohols having from about 10 to about 20 carbon atoms. Preferably, R has 10-16 carbon atoms. The alcohols can be derived from natural fats, e.g., coconut oil or tallow, or can be synthetic. Such alcohols are reacted with 1 to 30, and especially 1 to 12, molar proportions of ethylene oxide and the resulting mixture of molecular species is sulfated and neutralized.

Examples of alkyl ether sulfates, which can be employed as surfactants in the immobilizing composition, according to some embodiments of the present invention, include sodium coconut alkyl triethylene glycol ether sulfate, magnesium $C_{12-15}$ alkyl triethylene glycol ether sulfate, and sodium tallow alkyl hexaoxy ethylene sulfate. Preferred alkyl ether sulfates are those comprising a mixture of individual compounds, said mixture having an average alkyl chain length of from about 12 to 16 carbon atoms and an average degree of ethoxylation of from about 1 to 12 moles of ethylene oxide.

Additional examples of anionic surfactants, which can be employed as surfactants in the immobilizing composition, according to some embodiments of the present invention, include compounds that contain two anionic functional groups. These are referred to as di-anionic surfactants. Suitable dianionic surfactants are the disulfonates, disulfates, or mixtures thereof which may be represented by the following formulae $R(SO_3)_2M_2$, $R(SO_4)_2M_2$, $R(SO_3)(SO_4)M_2$, wherein R is an aliphatic hydrocarbyl group having 10-30 carbon atoms and M is a water-soluble cation. For example, the $C_{15-20}$ disodium 1,2-alkyldisulfates, $C_{15-20}$ dipotassium 1,2-alkyldisulfonates or disulfates, disodium, 1,9-hexadecyl disulfates, $C_{15-20}$ disodium 1,2-alkyldisulfonates, disodium, 1,9-stearyldisulfates and 6,10-octadecyldisulfates.

Non-ionic surfactants are also contemplated in some embodiments of the present invention, as a stabilizer of the wax colloid and/or as an additive of the immobilizing composition provided herein. Prominent among these are fatty alcohols, cetyl alcohol, stearyl alcohol, and cetostearyl alcohol (consisting predominantly of cetyl and stearyl alcohols), and oleyl alcohol, and amides and esters of such fatty alcohols.

Examples of non-ionic surfactants include amine-based surfactants, polyoxyethylene glycol alkyl ethers such as octaethylene glycol monododecyl ether and pentaethylene glycol monododecyl ether; polyoxypropylene glycol alkyl ethers; glucoside alkyl ethers such as decyl glucoside, lauryl glucoside and octyl glucoside; polyoxyethylene glycol octylphenol ethers such as Triton X-100 and Triton H-66; polyoxyethylene glycol alkylphenol ethers such as Nonoxynol-9; Glycerol alkyl esters such as glyceryl laurate; polyoxyethylene glycol sorbitan alkyl esters such as polysorbate; sorbitan alkyl esters such as spans; cocamide MEA, cocamide DEA; dodecyldimethylamine oxide; block copolymers of polyethylene glycol and polypropylene glycol such as poloxamers; and polyethoxylated tallow amine (POEA).

The amide-based (non-ionic) surfactants, which can be employed in the immobilizing composition, according to some embodiments of the present invention, can be represented by the general formula: $R_1C=ON(H)_n(R_2OH)_{2-n}$ wherein $R_1$ is an aliphatic hydrocarbon radical having from about 5 to about 30 carbon atoms, R2 is an aliphatic hydrocarbon radical having 1 to 6 carbon atoms and n is zero, 1 or 2. Preferred amide surfactants, according to some embodiments of the present invention include the monoethanol amides of $C_{10-16}$ fatty acids.

Silicone surfactants may include polyether modified polydimethyl-siloxane and the like. The polyether modified polydimethylsiloxanes may include, for example, BYK®-UV3510 (BYK Chemie GmbH, Wesel, Germany), and BYV-348 (BYK Chemie GmbH), such as, for example, BYK®-UV3510 (BYK Chemie GmbH, Wesel, Germany) and BYK®-348 (BYK Chemie GmbH), and fluorosurfactants, such as, for example, Zonyl® FSO-100 (E.I. Du Pont de Nemours and Co., Wilmington, Del.), having the formula $R_fCH_2CH_2-O-(CH_2CH_2O)_xH$, wherein $R_f$ is $F(CF_2CF_2)_y$, x=0 to about 15, and y=1 to about 7.

Fluorosurfactants may include anionic, cationic, amphoteric and nonionic fluorinated surfactants, for example, fluorinated alkyl esters. Other examples of fluorosurfactants suitable for use herein may include Innovative Chemical Technologies Inc. water soluble short-chain nonionic fluorosurfactant FS 8050. ZONYL® FSO-100 (E.I. Du Pont de Nemours and Co., Wilmington, Del.), having the formula $R_fCH_2CH_2-O-(CH_2CH_2O)_xH$, wherein $R_f$ is $F(CF_2CF_2)_y$, x=0 to about 15, and y=1 to about 7, FLUORADS® FC430, FC170C, FC171, and the like, available from 3M.

Other commercially available surfactant, suitable for the wax-colloid stabilization, according to embodiments of the present invention, include Disperbyk® 190, Disperbyk® 110, Bykjet® 9152, Bykjet® 9151, Bykjet® 9170, Tego Dispers® 650, Tego Dispers® 752, Tego Dispers® 750, Tego Dispers® 755, and the like.

According to some embodiments of the present invention, the wax-containing immobilizing composition comprises a cationic surfactant, as defined and exemplified hereinabove.

The amount of the surfactant in the wax-containing immobilizing composition presented herein is such that is sufficient to stabilize the wax particles in suspension, and thus depends on the amount and size of the wax particles in the composition. Hence, in some embodiments the amount of surfactant is proportional to the amount, shape and size of the wax particles, and generally stated in weight percent of the total weight of wax solids in the composition. In some embodiments the amount of surfactant is stated in weight percent of the total weight of the composition. The total amount of surfactants in the immobilizing composition refers to the surfactant added to the immobilizing composition to stabilize the wax colloid. In other words, the amount of surfactant in the composition is inclusive of any surfactant that may be included in a stock wax colloid.

In some embodiments, the immobilizing composition may include one or more surfactants in a total amount from about 0.001 weight percent to about 5 weight percent, based on the weight of the total immobilizing composition. Optionally, the surfactants' amount in the composition ranges from about 0.01 weight percent to about 3 weight percent, or from about 0.1 weight percent to about 2 weight percent, based on the total weight of the immobilizing composition.

In some embodiments, the immobilizing composition may include one or more surfactants in a total amount that ranges from about 30 weight percent to about 60 weight percent, based on the total weight of wax solids in the immobilizing composition.

Property-Adjusting Agent:

One of the objectives of using an immobilizing composition containing a property-adjusting agent as one (first) part, and an ink composition containing property-sensitive agent in a separate (second) part, is to provide the means to congeal and thereby immobilize the ink composition only upon contacting the two parts on the surface of the substrate and not beforehand, thus avoiding clogging the delicate elements of the printing machine. The property-adjusting agent is selected such that it effects a change in the property-sensitive agent, thereby effecting congelation of the ink composition.

The term "property" in the context of a "property-adjusting agent", as used herein, refers to a chemical and/or physical property of an ingredient in the ink composition that is sensitive to the presence or to an increase in the amount of the property-adjusting agent—a sensitivity that is expressed inter alia by losing the ability to stay dispersed or emulsified. In other words, the presence or an increase in the amount of the property-adjusting agent causes a property-sensitive agent in the ink composition to break the suspended or the emulsified state of the ink composition (dispensability), leading to immobilization thereof. Representative examples of such properties include, without limitation, acidity (pH), metal atom complexation (metal ion concentration), ionic strength and hydrophobicity.

Hence, the phrase "property-adjusting agent" as used herein refers to a component in the wax-containing immobilizing composition that can affect the dispensability of an ink composition comprising a property-sensitive agent, such that when the immobilizing composition and the ink composition come in contact and combine, the ink composition congeals. For example, an acid, acting as a property-adjusting agent in the immobilizing composition, will change pH level of the ink composition, causing a pH-sensitive agent therein to precipitate, thereby causing the ink composition to congeal. By effecting a change in one or more such properties, the property-adjusting agent is causing the property-sensitive agent to undergo a chemical and/or physical change (such as congelation), as discussed herein. Hence, in some embodiments, a metal-ion-ligand complexation, a sharp change in the ionic strength, a sharp change in the hydrophobicity or a sharp change in the electric charge/valency of the ink composition, will cause it to congeal.

An exemplary property is a pH-dependent dispensability and ionic-strength-dependent dispensability, wherein the change in pH (the aforementioned acidity or alkalinity property) or the ionic-strength of a solution changes the dispensability of one or more of its dispersed species. Similarly, there exist inter-dependency between metal ion complexation combined with pH, and the capacity to stay emulsified (dispersed), and such interdependency is discussed in detailed hereinbelow.

According to some embodiments of the present invention, the chemical property is pH-dependent dispensability, and the corresponding property-adjusting agent is an acid. Although most acids will cause an ink composition containing a pH-sensitive agent to congeal, some acids are preferable for use in an ink composition presented herein, which is formulated for inkjet printing, particularly on textile application.

One exemplary acidic property-adjusting agent is an organic acid. According to some embodiments, the organic acid is a carboxylic acid. Suitable organic acids include, but are not limited to a carbonic acid, a formic acid, an acetic acid, a propionic acid, a butanoic acid, an α-hydroxy acid such as glycolic acid and lactic acid, a halogenated derivative thereof and any combination thereof.

The selection of a suitable property-adjusting agent in the form of an acid should take into account several factors, namely the corrosive nature of acids on the fabric as well as on the delicate parts of the printing apparatus and particularly the printheads and other metallic and otherwise delicate parts of the printing machine which corrode easily, as well as the tendency of acids to scorch and degrade certain substrate materials over time. Hence, the acid should be effective enough to cause the desired property-adjusting effect, mild enough so as not to damage the machinery and/or garment, and transitory so as not to degrade the finished product.

According to some embodiments of the present invention, acids which may be eliminated from the resulting mixture on the substrate are jointly referred to herein as transitory acids. Elimination of the acid agent can be accomplished by neutralization, evaporation or transformation to a non-acidic species. In some cases elimination of the acid agent is effected, accelerated or energized by heat. Hence, the phrase "transitory acid", as used herein, refers to an acid which can be rid of by the virtue of being volatile or intra/cross-reactive to form essentially neutral species.

Transitoriness is required when it is desirable to have little or no traces of an acid in the final product. Therefore acid traces should be reduced before or during the curing step of the process (effected typically at 120-160° C.), and can no longer damage the substrate. On the other hand, the fumes of too-volatile acid will seep into the orifices, at print off-time, reacting with the other parts of the ink composition, causing immediate printhead blockage, and in longer time terms will cause corrosion of sensitive elements of the printing machine and the environment. Another factor is the workers' health which may be adversely effected by highly volatile acid such as formic acid. In addition, some volatile acids cause noxious or unpleasant odor even if minute reminiscence thereof is left in the finished product. Some volatile acids leave a distinct and mostly unpleasant odor, and therefore should be disfavored as noxious odor may affect the work place as well as cause malodor of the product at the end-user side. Hence, an odorless volatile or otherwise transitory organic acid should be selected when possible.

Some organic acids have relatively low boiling point, and can be readily removed from the substrate once the image has been printed, for example, during the curing stage that is typically carried out at 120-160 C°. For instance, formic acid boils at about 100 C°, acetic acid boils at about 118 C° and propionic acid boils at about 140 C°.

While evaporation is one mechanism by which heat can reduce the presence of a volatile acid, heat can also reduce acidity by other mechanisms. Some acid compounds may exhibit pH variability over a range of physical conditions, such as temperature. For example, some organic acid compounds may undergo a chemical reaction, such as condensations, upon applying heat to the composition. This chemical reaction ultimately leads to loss of the acidic property and an elevation and neutralization of the pH in the finished product after curing, which typically involves heating.

It is noted herein that in general alpha-hydroxy acids are suitable as a transitory acid according to some embodiments of the present invention. For example, lactic acid may be used to bring the pH of an aqueous solution to about 2-3 (pKa of 3.8 at 25° C. in water), but when heated above 100° C. in dehydrating conditions, lactic acid molecules react with one-another to afford the neutral and stable lactone specie known as lactide, which is the cyclic di-ester of lactic acid. Lactide may undergo further transformation and participate in the polymerization reaction on the substrate, as lactide is known to lead to the formation of PLA, poly-lactic acid polymers and co-polymers.

Another example for such a transitory acid is glycolic acid, which forms the cyclic and neutral lactone 1,4-dioxane-2,5-dione.

According to some embodiments, the pH-adjusting agent in an acid selected from the group consisting of a carboxylic acid, carbonic acid, formic acid, acetic acid, propionic acid, butanoic acid, an α-hydroxy acid, glycolic acid, lactic acid, any halogenated derivative thereof and any combination thereof. Such acids are also referred to herein as a small molecule acids.

Exemplary transitory organic acids which can provide all the above advantages with minimal disadvantages include, but are not limited to, acetic acid, lactic acid and glycolic acid.

Alternatively, according to some embodiments of the present invention, the pH-adjusting agent is an acidic polymer, which is selected to impart as little odor as possible to the printed film (image) and/or the printed substrate. In addition, according to some embodiments of the present invention, the pH-adjusting agent is a polymer selected so as to substantially not augment the color of the substrate and to minimize staining thereof.

The phrase "polymeric property-adjusting agent", as used herein, refers to a property-adjusting agent which is a polymer. A polymeric property-adjusting agent that acts by adjusting the pH of the environment of a pH-sensitive agent, is therefore a polymeric pH-adjusting agent. According to some embodiments, a polymeric property-adjusting agent is an acidic polymer. Alternatively, according to some embodiments of the present invention, the chemical property is pH-dependent dispensability, and the corresponding polymeric property-adjusting agent is an acidic polymer.

One of the advantages of using an acidic polymer, is the refrainment of including a small molecule acid in the immobilization composition. In some embodiments, small molecule acids (molecular weight lower than about 1500 g/mol) may be more corrosive on the fabric as well as on the delicate parts of the printing apparatus and particularly the printheads and other metallic and otherwise delicate parts of the printing machine. Small molecule acids may be volatile and therefore their acidic fumes may be more damaging to the substrate, machinery and environment. Hence, the choice of an acidic polymer, which is effective enough to cause the desired property-adjusting effect, is also made so as not to damage the machinery and/or garment, and mild enough and not odoriferous so as not to degrade the finished product. The acidic polymeric property-adjusting agent is beneficial also for its low boiling point, being higher than 200° C., and therefore is not volatile at ambient and printing conditions, lowering the risk of damaging the machinery and less likely to have noticeable odor.

In cases where an acidic polymer is advantageous over a small molecule acid, the acidic polymer is defined by, or selected according to one or more of the following attributes:

i. the acidic polymer has an average molecular weight that ranges from 2000 g/mol to 20000 g/mol;

ii. the acidic polymer is having a plurality of acidic functional groups attached thereto, such as carboxylic groups, phenol groups, sulfo groups, sulfino groups, aromatic sulfonamide groups, imide groups, phospho groups, phosphono groups and any combination thereof;

iii. acidic functional groups constitute from 50 percent to 70 percent by weight of the molecular weight of the polymer;

iv. the acidic polymer is having a pKa that ranges from 3 to 5 in water;

v. the polymer is characterized by water miscibility of at least 10% by weight in water;

vi. the amount of the polymer in the immobilizing composition ranges from 0.5% to 10% of the total weight of the composition;

vii. the odor threshold of the polymer, and of the resulting image or printed substrate is higher than 1 ppm by volume of air, as determined by methods known in the art [as described in "*Odor Threshold Determinations of* 53 *Odorant Chemicals*", by Leonardos, G. et al., *Journal of the Air Pollution Control Association,* 1969, 19(2), pages 91-95, or in "*Odor Thresholds and Irritation Levels of Several Chemical Substances: A Review*" by Ruth, J. H., *American Industrial Hygiene Association Journal,* 1986, 47(3), pages 142-151. For example, acetic acid is characterized by a distinctive odor of vinegar, which is noticeable at 1 ppm (by volume) or 2.5 mg/m$^3$]; and viii. The acidic polymer is non-staining to the substrate and thus substrate substantially devoid of substrate color augmentation around the printed image (film) [for example, a substrate substantially devoid of substrate color augmentation around the printed image (film), is defined as having ΔE lower than about 0.2, lower than 0.25, lower than 0.3, lower than 0.5, lower than 1, lower than 1.5, or lower than 2, based on measuring "point 1" in the substrate having the immobilizing composition thereon, and "point 2" in the substrate having no immobilizing composition thereon, recording CIE L*a*b* and calculating the difference in the CIE L*a*b* according to $\Delta E=[(L_1-L_2)^2+(a_1-a_2)^2+(b_1-b_2)^2]^{1/2}$].

Exemplary acidic polymers, which are contemplated as polymeric property-adjusting agents in the context of some embodiments of the present invention, include, without limitation, polyacrylic acid, acidic alkoxylated polymer, poly(2-acrylamido-2-methylpropanesulphonic acid), poly (acrylic acid-co-maleic acid), and any mixture thereof.

The acid (small molecule acid or acidic polymer) may be mixed in the wax-containing immobilizing composition with or without buffering. According to some embodiments, a wax-containing immobilizing composition may be buffered by a suitable salt or weak base, such as ammonia/ammonium base or another volatile amine, to ensure full extraction of any traces of acid or base in the printed image. Buffering may be accomplished by a buffering agent, such as, but not limited to a weak amine such as tris(hydroxymethyl aminomethane), also referred to as Tris or THAM.

In embodiments wherein the property-adjusting agent is an acid, the pH of the wax-containing immobilizing composition ranges about 2-6, or about 2-5, or about 2-4. Optionally, the pH of the wax-containing immobilizing composition ranges about 3-6, 4-6 or 5-6.

Ink Composition Designed for Immobilization:

The wax-containing immobilizing composition presented herein is designed to interact with a suitable colored ink composition, referred to herein in short as "ink composition". The ink composition is the liquid formulation that carries a colorant to the surface of the substrate, thereby forming a printed image or design thereon, while the wax-containing immobilizing composition is substantially devoid of a colorant, and is designed not to impart a notable or any mark on the substrate. The interaction between the immobilizing composition and the ink composition leads to congelation of the ink composition, effected by coagulation on the property-sensitive agent therein.

The ink composition, comprises a colorant, a property-sensitive agent and a carrier. The ink composition may further include other ingredients, such as a resin binder, a film-forming agent, an adhesion promoting agent and a dispersing agent.

According to some embodiments, the property-sensitive agent is in a form of a dispersed agent and/or emulsified agent. In such embodiments, the presence of the property-adjusting agent causes the property-sensitive dispersed agent and/or property-sensitive emulsified agent to break out of its dispersed and/or emulsified state and cause immobilization of the composition. The immobilization of the ink composition is caused by coagulation or congelation of the property-sensitive agent, which leads to immobilization of the colorant (typically a pigment) and to notable limitation of its soaking and bleeding capacity.

In some embodiments, the emulsified and/or dispersed property-sensitive agent is an alkali-soluble polymer, which is a polymer that in its neutral or free-acid form is immiscible or almost immiscible in water, but can be turned miscible, emulsified or dispersed in water when it is rendered alkali by buffering with an organic base, such as an amine, or an inorganic base.

In some embodiments, the property-sensitive agent is at least one of the group consisting of a resin binder, a dispersing agent, an adhesion promoting agent and a film-forming agent. In some embodiments, the property-sensitive agent is a dispersing agent, such as used for dispersing pigments. In some embodiments, the property-sensitive agent is a resin binder, such as used to improve the cohesion of the film. In some embodiments, the property-sensitive agent is an adhesion promoting agent, such as used to improve the adhesion of the film to the substrate. In some embodiments, the property-sensitive agent is a film-forming agent.

In some embodiments the properties of binding, film-forming, adhesion promotion and dispersion are combined into one or two or three agents, namely an agent in the ink composition may carry out more than one of the functions of binding, film-forming, adhesion promotion and dispersion.

In some embodiments, the property-sensitive agent is an emulsified or dispersed alkali-soluble polymer selected from the group consisting of a polyacrylate, a polyurethane, a polyether, a polyester, a polyvinyl chloride, a polyvinyl acetate, a polyvinyl butyral, an aminosilicon and any co-polymer, salt or combination thereof.

Any one of the above resin binder, a dispersing agent, an adhesion promoting agent and a film-forming agent, and other optional and/or additional ingredients of the ink composition may also confer stretchability to the resulting image. Such agents are generally referred to herein as proto-elastomeric film-forming agents which imparts elastic stretchability. In some embodiments the proto-elastomeric film-forming agent is also the property-sensitive agent, and in some embodiments the proto-elastomeric film-forming agent is not the property-sensitive agent. In general, when proto-elastomeric film-forming agents co-polymerize, cross-link and cure and thereby affix to the substrate, a soft, flexible and stretchable elastic film is formed which is characterized by a relatively low Tg.

According to some embodiments of the present invention, the ink composition is a water-based inkjet ink composition, thus the carrier of the ink composition is an aqueous carrier or water.

The ink compositions contemplated within the scope of the present invention, may carry transparent or translucent colorants. The basic colorants in inkjet ink compositions are required to be transparent or translucent, since only a few (typically 3-8) basic colors are used and the full spectrum of colors and shades is achieved when these basic colors are perceived by the eye as mixed in various combinations on the substrate. However, direct printing of multicolor images using transparent inks on any surface requires the surface, which is the background of the image, to be white or at least lightly-colored, since its inherent color participates in the formation of the final perceived color, together with the colorant in the inks applied thereon. Surfaces of darkly colored or non-white substrates tend to render the primary-colored ink drops indistinguishable or substantially color-skewed since the final perceived color stemming from any combination of the primary colors is a subtraction of that particular combination from the color white, or at least from a bright light color. It is therefore a physical requirement that the background of an image generated directly onto a surface be a bright light color or white.

To overcome the problem of printing on a non-white substrate, an opaque white underbase layer may be printed on the substrate before the translucent colored ink composition is printed. This opaque underbase layer is afforded by an opaque ink composition, according to some embodiments of the present invention. The opaque ink composition, according to some embodiments of the present invention may also contain a property-sensitive agent, and thus may be designed to congeal upon contacting the wax-containing immobilizing composition presented herein.

According to some embodiments, the opaque ink composition is essentially white, affording an opaque white layer when jetted on a darkly-colored or non-white surface. According to some embodiments, the white opaque pigment is suitable-sized particles of a metal oxide, such as, for example, titania (titanium oxide).

According to some embodiments, in order to serve as an underbase for a stretchable and flexible image, the opaque underbase should also be stretchable, with a high elongation factor that enables the image printed thereon to maintain its background when stretched with the substrate, without having the (colored) substrate to be seen therethrough and without having the image or the underbase crack under physical pull and tug.

The opaque ink composition, according to some embodiments of the present invention, is suitable for inkjet printing of "spot" colorants, which are substantially opaque colored inks. Spot colorant can be jetted like any other transparent colorants, and are typically used to generate special effects in order to afford highlights and emphases over the image usually in pre-defined coloration.

In general, any reference to an ink composition made herein, should be taken as referring to any translucent ink composition of any color, and to any opaque ink composition of white or any other spot color, unless stated otherwise.

U.S. Pat. No. 7,134,749, by the present assignee, which is incorporated by reference as if fully set forth herein, teaches a method and an apparatus for color printing on a dark textile piece which includes digitally printing, by means of an inkjet printer head, an opaque white ink layer directly onto a dark textile piece, and digitally printing a colored image on the white ink layer. One of the main principles in this method is the digital printing of the white ink layer, which is performed such that the white ink layer substantially covers, without exceeding, the designed area of the next to be printed colored image, and further such that the white ink layer and the colored image are substantially coextensive. All the printing steps in this method are performed by essentially using conventional inkjet printing techniques.

PCT Application Nos. WO 2005/115089 and WO 2005/115761, by the present assignee, and which are both incorporated by reference as if fully set forth herein, teach a process, a composition and an apparatus for printing an image on an absorptive surface, such as a textile piece, that includes applying a wetting composition on the surface which is capable of interfering with the engagement of a liquid ink composition with the binding sites of the surface. According to the processes taught in these patent applications, once the wetting composition is applied, the liquid ink composition is applied while the surface is still wet. Using this process, a vivid color image is formed on the absorptive surface. These patent applications, however, fail to address the limitations associated with printing a color image on an absorptive dark surface.

Multi-part ink compositions, which are based on contacting an immobilizing composition and a colored ink composition on the surface of a substrate, so as to congeal the colored ink composition on the substrate, thereby minimizing feathering and soaking thereof into absorptive substrates, are also taught in U.S. patent application Ser. No. 11/588,277 (U.S. Patent Application Publication No. 20070104899), U.S. patent application Ser. No. 11/606,242 (U.S. Patent Application Publication No. 20070103529), and U.S. patent application Ser. No. 14/619,218 (U.S. Patent Application Publication No. 20150152274), all of which are incorporated by reference as if fully set forth herein.

U.S. Pat. No. 8,540,358, by the present assignee, which is incorporated by reference as if fully set forth herein, teaches an inkjet ink compositions for forming an image in a form of an elastic film attached to a surface of a stretchable and/or flexible substrate and processes utilizing same for inkjet printing color images on various substrates such as colored and absorptive or impregnable stretchable materials, which are characterized by heightened efficiency in process time, ink and energy consumption, as well as products having durable, wash-fast and abrasion-fast images printed thereon by the process, are disclosed.

A Process of Printing Rub-Resistant Inkjet Prints:

The process, according to embodiments of the present invention, is based on the use of multi-components (parts) ink compositions, wherein all of the components (parts) are formulated and selected to be suitable also for the main inkjet printing techniques, such as the "drop-on-demand" technique and the likes, as these techniques are familiar to any artisan skilled in the art. Therefore, according to embodiments of the present invention, each of the wax-containing immobilizing composition and/or ink composition used in the processes presented herein is for use in an inkjet printing machine, wherein each compositions is applied (jetted, printed) from at least one different designated printhead and/or nozzle.

The process presented herein is directed at a typical inkjet technique, as known in the art, which is performed using standard or proprietary printheads and other printing machinery.

The wax-containing immobilizing composition presented herein is used to cause congelation of any ink composition, translucent or opaque, as long as it contains a property-sensitive agent. This instant immobilization of the jetted droplets of the ink composition subsequently promotes improved color and detail resolution of the image, as well as improved contact between the colorant(s) in the ink composition and the substrate, which is effected by better adhesion of the medium containing the colorant (pigment and/or dye) therein to the substrate. The binding, cohesion and adhesion of the medium containing the colorant may be effected by, for example, direct heat-activated chemical crosslinking or entanglement of polymerizable components in the ink composition with functional groups in the substrate.

According to an aspect of embodiments of the present invention, there is provided a process of printing an image on a substrate, which includes contacting at least a portion of the substrate with the wax-containing immobilizing composition presented herein, and applying the ink composition presented herein on at least some of that portion of the substrate, thereby printing the image.

According to some embodiments of the present invention, the process is effected by digitally applying, by means of a plurality of inkjet printheads and/or nozzles, onto at least a portion of a surface of the substrate, any of the wax-containing immobilizing composition and ink compositions presented herein, jointly referred to herein as a multi-part ink composition, which are formulated to be suitable for use in inkjet printheads and/or nozzles.

Since each of the immobilizing and/or ink composition used in the process presented herein is jetted by a digitally-control liquid applicator, the areas onto which each composition is applied can essentially overlap, covering substantially the same area of the image (coextensive areas). In particular, the wax-containing immobilizing composition, which is essentially colorless and transparent, is applied onto the surface as a silhouette of the image, namely as a solid outline and featureless interior of the image. The silhouette may be somewhat larger that the image that will be printed thereon by 1-30%, or by 1%, 5%, 8%, 10%, 15%, 20%, 25%, or 30%. This digital control of applying the immobilizing composition further contributes to the reduction in the amount needed to effect immobilization of the ink composition, as the immobilizing composition does not form extending margins peripheral to the image, or form controllable extending margins. This effect also widens the scope of suitable substances which can be used to formulate the wax-containing immobilizing composition, as staining of unprinted areas of the substrate which are not covered by colorants, is no longer a problem.

As presented hereinabove the wax-containing immobilizing composition and the ink composition, are each individually applied on the substrate by a separate applicator (nozzle and/or printhead) so as to keep the property-adjusting agent and the property-sensitive agent apart at all times before applying them on the substrate.

According to some embodiments, the immobilizing composition is applied by a nozzle and the ink composition is applied by an inkjet printhead. According to some embodiments both the immobilizing composition and the ink composition are applied by separate inkjet printheads, referred to herein as the first printhead and the second printhead, respectively.

The printing process is designed and programmed such that the various compositions are applied concomitantly (or essentially simultaneously) on the surface of the substrate by a digitally controlled precise mechanism, and that every drop in the color/pigment-containing parts of the ink composition will come in contact with the immobilizing composition. The sequential order by which the immobilizing composition and ink composition are applied on the substrate can be any order, as long as the two types of liquid compositions come in contact therebetween before one of the compositions dries. Hence, according to some embodiments the immobilizing composition and the ink composition are applied concertedly, concomitantly or sequentially. In some embodiments, the ink composition is applied on the substrate while the substrate is still wet with the immobilizing composition, or vice versa (in the reversed order).

The process presented herein, according to some embodiments thereof, is effected by applying all the various compositions, or parts of the multi-parts ink composition, by means of separate inkjet printheads/nozzles concurrently, substantially concomitantly, or very near concomitant application thereof. The term "concomitantly", as used herein, refers to the timing of one or more occurrences which take place concurrently, or almost concurrently, namely within a short time interval. According to embodiments of the present invention, this short time interval is less than one second, less than 3 seconds, less than 5 seconds, less than 10 seconds, less than 20 seconds, less than 30 seconds, less than 40 seconds, less than 50 seconds or less than 60 seconds between contacting the surface of the substrate with the immobilizing composition and contacting the surface of the substrate with the ink composition, or vice versa (in the reversed order). According to some embodiments, the time gap or interval between applying the immobilizing composition and the ink composition is shorter than about 1-10 seconds. The time interval is regarded as the time the lapses between the time a droplet of a composition containing a property-adjusting agent or property-sensitive agent contacts the substrate, and the time a droplet of the counterpart component contacts the same region of the substrate. According to some embodiments of the present invention, this time interval can be shorter than 0.75 second, shorter than 0.50 seconds and even shorter than 0.25 seconds.

Since all the parts of the multi-part ink composition can be applied on the substrate by means of printheads/nozzles which jet very small droplets of liquids at a controllable rate, one of the advantages of the process presented herein, is a considerable reduction in the total amount of applied liquids which are required to form a vivid and durable image of the substrate, a factor that translates directly into reduced drying and curing times, leading to a great reduction in energy costs.

According to some embodiments, the process presented herein further includes a curing step, at which the ink composition forming the printed image is subsequently cured. Curing can be effected by heating, irradiating or pressing the substrate. According to some embodiments, curing is effected by hot air convection that heats and dries the substrate.

Kits for Printing a Rub-Resistant Image:

Any of the compositions presented herein, can be provided to a user in the form of a kit. The term "kit", as used herein, refers to a single package containing any collection of items or components needed for a specific purpose, especially for use by a user or an operator.

According to an aspect of some embodiments of the present invention, there is provided a kit that includes a packaging material, a wax-containing immobilizing composition, according to embodiments of the present invention, and at least one ink composition, according to embodiments of the present invention.

According to some embodiments of the present invention, the kit is in a form wherein some of the ingredients of any one of the compositions presented herein, are packaged individually (separately) within the kit. According to some embodiments of the present invention, the kit may include one or more of the compositions in a ready-for-use form, packaged together within the kit.

According to some embodiments of the present invention, the kit contains at least two separate containers for each of the immobilizing and the ink compositions, and can be used for loading two separate inkjet printheads or nozzles with their contents in preparation for an inkjet printing process, as described hereinabove.

In some embodiments, the packaging material is identified in print for use in printing a rub-resistant image on a substrate that is effected by coagulating the ink composition upon contacting it with the wax-containing immobilizing composition.

The kit may further include instructions for the user that includes the following directives:

Load the wax-containing immobilizing composition to a first printhead or nozzle;

Load the ink composition to a second printhead; and

Contact the wax-containing immobilizing composition with the ink composition by inkjet printing the compositions on a substrate.

The kit may further include other ink compositions, such as translucent colored compositions and/or opaque white or colored compositions packaged individually within the kit.

Rub-Resistant Printed Image:

According to an aspect of some embodiments of the present invention, there is provided a substrate, such as for example a textile substrate, having a rub-resistant image printed on at least a portion thereof using a wax-containing immobilizing composition and an ink composition as presented herein. According to some embodiments, the image is in the form of a film attached to the substrate and the film is formed by contacting the substrate with the wax-containing immobilizing composition presented herein, and applying an ink composition on the substrate, thereby forming the image.

The terms "rub-resistance" or "rub-resistant" are used herein to describe the capacity of a printed image, such as an image inkjet-printed on the surface of a textile substrate, to withstand mechanical wear while sustaining minimal color loss or film crocking. In the field of textile and garments, rub-resistance of typically tested by testing colorfastness under mechanical stress such as rubbing the surface of the tested sample with another surface such as a piece of fabric, and measuring the amount of color transferred from the sample to the rubbing surface. Specifically, methods for testing rubbing fastness are designed to determine the degree of color which may be transferred from the surface of a colored fabric to a rubbing cloth which is rubbed, dry and wet, against the tested sample.

AATCC-08, also known as the American Association of Textile Chemists and Colorists Test Method 8, and ISO-105-X12, are two exemplary standard colorfastness to rubbing test methods that are used in the textile industry. In general, the results of the tests are given in color levels of the rubbing cloth, which is regarded as colorless before the test. For example, an image that is less colorfast, will transfer more color to the rubbing cloth than a colorfast image, and the difference between the levels of transferred colors can be used to denote the colorfastness of the sample.

In the context of some embodiments of the present invention the cured film (cured image) formed on a substrate using any of the compositions and processes provided herein, is characterized by a colorfastness to rubbing of at least 50% as determined according to an AATCC 8 colorfastness to rubbing test. In some embodiments the colorfastness to rubbing is determined using a standard crockmeter known in the art, a piece of white cloth and a color-intensity measuring device. In general, the test is performed by covering a flat round tip of the arm of the crockmeter with the white cloth, setting a weight to the arm, setting the rubbing travel of the tip on the sample, and setting the time or number of travels. After completing a test run (running the pre-determined number of rubs), the color imparted to the cloth is measured and reported. The results are collected for an image printed with a wax-containing immobilizing composition and for an image printed with an immobilizing composition devoid of wax as control. The difference between the two results is divided by the value of the control, and recorded in percent to denote the rub-resistant effect of the wax.

It is noted herein that other modes and methods of measuring and assessing the effect of using the wax-containing immobilizing composition to form an image by inkjet printing, according to embodiments of the present invention, and comparing the same to a corresponding image formed without wax, are contemplated. For example, hand-feel assessment, washfastness, slippage and friction coefficient assessments, as well as other organoleptic and mechanized methods.

An exemplary washfastness test for determining the effect of using a wax-containing immobilizing composition to form an image, compared to an image formed without wax, may be carried out by measuring color intensity of the image after 5 wash cycles at 40° C. and wringing at 1000 rpm.

Various Additives of Ink Compositions:

Following are descriptions and examples of various ingredients of the various compositions presented herein.

Exemplary film-forming agents include, without limitation, nonionic water-emulsifiable resins such as acrylic polymers and copolymers, alkyl-acrylic polymers and copolymers, acrylic-styrene copolymers, polyurethanes, polyethers, polyesters, polyacrylates and some combinations thereof.

According to some embodiments of the present invention, the film-forming agent is a self-crosslinking alkyl-acrylic copolymer, and according to some embodiments, the self-cros slinking alkyl-acrylic copolymer is an ethyl-acrylic/butyl-acrylic copolymer. Some acrylic-based polymers and copolymers are emulsifiable self-crosslinking polymers which are used in the garment industry to bestow physical and chemical resistance to the cloth, knitted, woven or non-woven, against physical wear and tear due to frequent use and repeated washing, as well as against alcohol, organic solvents and water.

When selected to have a low Tg, according to embodiments of the present invention, commercially available suitable film-forming agents, which may also serve as pigment dispersants in a relevant composition, include without limitation, TEXICRYL™ 13-216 (Tg −14° C.), TEXICRYL™ 13-290 (Tg −30° C.), TEXICRYL™ 13-297 (Tg −9° C.) and TEXICRYL™ 13-326 (Tg −25° C.) which are commercially available from Scott Bader Ltd., and APPRETAN™ E 2100 (Tg −30° C.), JONCRYL™ 617 (Tg +7° C.), APPRETAN™ E 6200 (Tg −20° C.) and APPRETAN™ E 4250 (Tg −15° C.) which are commercially available from Clariant.

Other non-limiting examples of commercially available film-forming agent ACRYSOL™ series, commercially available from Rhome and Hass Ltd., and ACRONAL™ series, commercially available from BASF Inc.

Other binders, dispersants and adhesion promoters which are useful in the context of an elastomeric film-forming agent according to embodiments of the present invention include, without limitation, commercially available and widely used families of products, known under names such as Alkydal™, Desmodur™ and Desmophen™ (from Bayer); Beckopox™, Macrynal™, Maprenal™, Viacryl™ and Vialkyd™ (from Vianova Resins); Cythane™ (from Cytec); Dynapol™ and Vestanat™ (from Hiils); Johncryl™ (from Johnson); K-Flex™ (from King Industries); Synocure™ and Synolac™ (from Cray Valley); Synthalat™ (from Synthopol); Tolonate™ (from Rhone Poulenc); Uracron™ and Uralac™ (from DSM); Worleecryl™ and Worleekyd™ (from Worlee) and the likes.

It is noted that any exemplary ingredient disclosed herein is given for exemplifying purposes only, and should not be regarded as limiting to that particular ingredient or commercially available product, but rather regarded as a representative member of a wider group of alternatives, all of which are meant to be encompassed in the context of other embodiments of the present invention.

Additional optional ingredients in the various compositions presented herein include surface active agents and viscosity modifying agents.

Exemplary surface active agents include, without limitation, polyether modified poly dimethyl siloxanes, polymethylalkylsiloxane, polyester hydroxyl modified poly-dimethylsiloxane, a fluorocarbon/hydrocarbon anionic surfactant, a polyacrylic copolymer and any combination thereof.

Exemplary viscosity modifying agents include, without limitation, associative thickeners, Newtonian rheology additives, glycols, polyethyleneglycol, propylene glycol, triethylene glycol, diethylene glycol, glycerin, high molecular weight alcohols, carbowaxes, polyvinyl alcohols, polyvinyl pyrrolidones, and any combination thereof.

Exemplary anticorrosion agents include, without limitation, tolyltriazole (methylbenzotriazole, benzotriazole, and combinations thereof.

It is expected that during the life of a patent maturing from this application many relevant methods, uses and compositions will be developed and the scope of the terms methods, uses, compositions and polymers are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Immobilizing Composition Comprising Wax

An exemplary immobilizing composition comprising a wax colloid, according to some embodiments of the present invention, is presented hereinbelow. This immobilizing composition is formulated to effect immobilization by congelation of an acid-sensitive soluble/emulsified polymeric binder which forms a part of an alkaline colored ink composition upon contact therebetween.

The following is a general makeup of a wax-containing immobilizing composition, listing the ingredients with amounts given in percent by weight of the total weight of the composition, and relative amounts of the ingredients are given as percent by weight unless stated otherwise.

| Acid | 0.1-10% |
| --- | --- |
| Wax solids content in final composition | 0.1-4% |
| (or wax colloid stock having 20-40% solids | 0.5-10%) |
| Surface active (wetting) agent/surfactant | 0.01-2% |
| Viscosity modifying agent/Humectant | 0-70% |
| Defoamer | 0-2% |
| Various other additives | 0-20% |
| Deionized water | QS to 100% |
| pH buffered to | 2.5-6 |

The following are exemplary wax-containing immobilizing compositions, according to some of embodiments of the present invention, which was prepared as follows.

Wax-Containing Immobilizing Composition I:

| Acetic acid | 1.9% |
| --- | --- |
| Oxidized PE wax (CAS No. 68441-17-8) with cationic surfactant* (0.3-0.8% wax solids content in final composition) | 1-3% |
| Surfynol ® 104 (additional surfactant) | 0.2% |
| Deionized water QS to | 100% |
| pH buffered by sodium acetate to | 2.5-4 |

Wax-Containing Immobilizing Composition II:

| Lactic acid (88 %) | 5-8% |
| --- | --- |
| Oxidized PE wax (CAS No. 68441-17-8) with cationic surfactant* (0.5-0.8% wax | 2-3% |

| solids content in final composition) | |
| --- | --- |
| Ammonium lactate | 1-3% |
| Propylene glycol | 50-60% |
| Monoethylene Glycol (MEG) | 2-3% |
| Defoamer (Lumiten ®) | 0.1-0.3% |
| Wetting agent (BYK-3410) | 0.2-0.5% |
| Deionized water QS to | 100% |
| pH buffered by sodium acetate to | 3-4 |
| *A stock wax colloid may be, for example (given in weight percent of total stock wax colloid weight): | |
| CERAFLOUR ® 950 wax particles (m.p. 145 C. °) | 35%; |
| Tego Dispers ® 750 (surfactant) | 15%; and |
| Deionized water | 50%. |

Alternatively, a commercially available stock wax colloid can be used, such as Lakewax® C37, by Lakeland™, having a pH of 3-5, solids contents of 25-29%, and average particle size of about 660 nm (0.66 microns).

These compositions were used in the following examples to form images on cotton and polyester substrates, which were tested for their rub-resistance.

Example 2

Rub-Resistance Tests

The following is an exemplary process using a wax-containing immobilizing composition, according to some embodiments of the present invention. It should be noted that this exemplary process is applicable for use in combination with other transparent or opaque colored ink compositions and opaque white (underbase) ink compositions, some of which are presented herein.

The exemplary printing process, according to embodiments of the present invention, was performed as follows:

A cotton textile substrate was placed in a printing machine equipped with a plurality of printheads (Kornit™ "Drop-On-Demand" Thunder™ inkjet printing machine.

A wax-containing immobilizing composition, comprising 1% solids of an oxidized polyethylene wax, suspended by a cationic surfactant (Composition I), was loaded into a reservoir connected to a nozzle, whereas each of the transparent colored and white underbase ink compositions were loaded into a separate reservoir connected to a separate printhead.

The substrate was placed on the printing pallet, and the wax-containing immobilizing composition was applied on the substrate, followed substantially concomitantly with the printing of the white and colored ink compositions.

It is noted that in this example, while the white and colored ink compositions were applied using an inkjet printhead within the borders of the image (silhouette), the wax-containing immobilizing composition was sprayed more loosely using a nozzle applying a more coarse jet of droplets, covering a slightly larger area of the image. It is further noted that the same process can be carried out effectively using a printhead to apply the wax-containing immobilizing composition on the same area or an area that essentially overlaps with the image more precisely.

After the image has been formed, the substrate carrying the image was exposed to heat of 120-160° C. for curing, and fusing the wax into the resulting film, constituting the image.

A similar image was formed in a similar process using an immobilizing composition devoid of the wax.

The images which were formed by the above process were tested for rub-resistance following the "Colorfastness to Crocking: AATCC Crockmeter Method" for testing colorfastness under mechanical stress, according to the "AATCC 8" standard (also known as the American Association of Textile Chemists and Colorists Test Method 8, and can be substituted with ISO Test Method 105-X12 rubbing fastness test).

Briefly, the test method is designed to determine the amount of color transferred from the surface of colored textile materials to other surfaces (fabrics) by rubbing. It is applicable to textiles made from all fibers in the form of yarn or fabric whether dyed, printed or otherwise colored. The test procedure employs white test cloth squares, both dry and wet with water. As washing, dry cleaning, shrinkage, ironing, finishing, etc., may affect the degree of color transfer from a material, the test may be made before, after, or before and after any such domestic fabric treatments.

A sample fabric having an image printed thereon as described above was fastened to a crockmeter (Manual Crock Meter—QT-7034-B) and then rubbed against a white cloth affixed to a standard rubbing peg. This test was carried out to determine the amount of color transferred from the tested printed image to the white cloth by rubbing.

Each ink was printed as a square of 300×300 mm on cotton fabric, dried and cured left in ambient for 48 hours and then tested for rub resistance.

Manual crockmeter parameters used in the rub-resistance tests were as follows:

| | |
|---|---|
| Arm load | 900 grams |
| Abrasion stroke travel | 100 mm |
| Abrasion peg head | Φ 16 mm |
| Operation | Manual/Single hammer |
| Counter | 0-9,999 |
| Sample dimensions | 68 × 18 × 25 cm (26.8" × 7" × 9.8") |
| Rubbing speed | 30 cm per minute |

The dry rub-resistance test was performed when an abrasion peg head, covered with standard white cotton fabric (white cloth), was rubbed over the printed sample for 20 strokes. The amount of color transferred by rubbing from the printed image to the white cotton fabric was measured with Eye One meter.

The crockmeter was also employed to perform rub abrasion, scuff and/or mar tests on the tested specimens, and further used to conduct smudge and smear resistance tests on the printed images.

The tested samples were brought into moisture equilibrium for testing in standard atmosphere for testing textiles according to AS™ D-1776, conditioning Textiles for Testing.

The amount of color transferred to the test cloth was be assessed by comparison with the AATCC Chromatic Transference Scale using *Lab Colorimetric Parameters, using a Gretagmacbeth Eye One display colorimeter by X-Rite.

FIG. 1 presents a photograph, rendered in greyscale, of two pieces of white cloth used in the colorfastness to rub tests which were conducted on a cyan image, wherein the right-hand sample is the test cloth used on an image printed using a wax-containing immobilizing composition, according to embodiments of the present invention, and the left-hand sample is a similar test cloth used on an image printed using an immobilizing composition devoid of wax.

As can be seen in FIG. 1, the white cloth that was rubbed against the image printed while using a wax-containing immobilizing composition, (right-hand sample in FIG. 1) is substantially less stained than the white cloth that was rubbed against the image that was printed while using a similar immobilization composition that is devoid of wax particles (left-hand sample in FIG. 1). A quantitative analysis of that result, and similar results obtained for the other CMYK colors are presented in Table 1 below.

The effect was quantified as the difference in the intensity of the basic color (ΔE) before and after the rubbing the white test cloth in the crockmeter; the results of this rub-resistance tests are summarized in Table 1 presented below. The colorfastness to rubbing is determined as ΔE without wax minus ΔE with wax, divided by ΔE without wax, multiplied by 100 (percent). The amount of color lost from the printed image was also measured (results not shown).

TABLE 1

| Immobilizing composition | ΔE (Cyan) | ΔE (Magenta) | ΔE (Yellow) | ΔE (Black) |
|---|---|---|---|---|
| Devoid of wax | 15.2 | 30.1 | 28 | 27.6 |
| Wax-containing | 5.1 | 8.4 | 7.5 | 9.9 |
| colorfastness to rubbing | 66% | 72% | 73% | 64% |

As can be seen in Table 1, adding wax to the immobilizing composition had a beneficial effect on the rub-resistance of the image, as expressed by the low levels of color transferred to the other surfaces by rubbing. The average colorfastness to rubbing is about 70%.

Example 3

The following is a description of a test for the efficiency and advantages conferred by admixing a wax into a composition, such as an immobilizing composition, which is not the colorant-containing composition (colored ink composition).

Specifically, the following experiments provide the means to evaluate the benefits obtained by using a wax-containing immobilizing composition versus the using a colorant-bearing ink composition that also comprises a wax.

It is noted that the experimental procedure does not test for other benefits arising from placing the wax colloid in the immobilizing composition rather than in the underbase/colored ink composition, such as the more versatile range of inks that can be used when not having to include a wax colloid, the wider range of wax colloids (e.g., particle size and solid contents) that can be used when placed in the immobilizing composition rather than in the underbase/colored ink composition, the wider range of apparatus that can be used to dispense the immobilizing and inks compositions (nozzles versus the more sensitive and expensive printheads), the broader area of the substrate receiving the wax-containing composition, and other practical and economic benefits.

It is noted that wax colloid that can be added to an alkali composition is different than wax colloid that can be added to an acidic composition in the sense that the surfactant used to stabilize the colloid should match the pH of the composition.

The tests are based on essentially the same experimental procedures and parameters and essentially the same analysis procedures presented in Example 2 above, except for using different combinations of immobilizing and colored ink compositions, varying in the type and content of a wax colloid therein. Table 2 presents the various combinations of immobilizing and colored ink compositions that are compared, and the Colorfastness/Crocking test results in terms of ΔE for each of the basic colors CMYK.

TABLE 2

| Immobilizing composition (acidic) | Underbase/ colored ink composition (alkali) | Colorfastness/ Crocking test results (ΔE CMYK) | | | |
|---|---|---|---|---|---|
| No wax | No wax | 15.2 | 30.1 | 28 | 27.6 |
| Cationic wax colloid | No wax | 5.1 | 8.4 | 7.5 | 9.9 |
| No wax | Nonionic wax colloid | >5.1 | >8.4 | >7.5 | >9.9 |
| No wax | Anionic wax colloid | >5.1 | >8.4 | >7.5 | >9.9 |

Thus, adding the wax to a composition that is not a colored ink compositions, and that is applied onto the substrate during the printing process, such as an ink immobilizing composition, is advantageous as it broadens the range of machines that can be used for printing, and the range of inks and waxes that can be used in a printing process designed to introduce a wax to the printed substrate. Specifically, the presently provided methodology widens the choice of wax and ink materials we can use, as the particle size and the stability of wax dispersion in inks is no longer an issue, and the delivery of a wax-containing immobilizing composition can be effected using less restricted mechanical applicators (such as a nozzle) having wider passageways and higher operating pressure, allowing wider substrate coverage and eliminating the risk of clogging.

Example 4

The following is a description of a printing process wherein various colored ink compositions are used in conjunction with the wax-containing immobilizing composition, according to some embodiments of the present invention.

A wax-containing immobilizing composition is loaded into a mechanism that is configure to apply the composition onto the substrate based on a set of computer-generated actuation commands. Other separate printheads may be loaded with other ink compositions, such as:

A translucent cyan colored composition;
A translucent magenta colored composition;
A translucent yellow colored composition;
A translucent black colored composition; and
An opaque white underbase composition.

Optionally additional colored ink compositions such as green, red, light colors and others can be added in additional separate printheads so as to extend the range of color gamut/spectrum.

Once the portion of the substrate corresponding to the silhouette of the image is applied with the wax-containing immobilizing composition (see, for example, Examples 1 and 2), the printheads containing the opaque white composition and the printheads containing the CMYK compositions, may apply a mixture of opaque and/or translucent ink compositions over the same portion of the area where the dye has been discharged from the substrate.

It is noted that this process may be effected without applying an underbase layer of an opaque white colorant, particularly in substrates which are substantially white, or when the specific requirements allow the design to be printed over dyed background without further whitening thereof.

Optional Colored Composition:

A typical translucent colored composition, according to some embodiments of the present invention, generally formulated using ingredients wherein at least one of which is acid-sensitive in the sense that it caused the immobilization of the ink upon making contact with an acid. The following composition ingredients are provided with amounts given in percent by weight of the total weight of the composition:

| | |
|---|---|
| Pigment | 1.5-5% |
| Dispersant (can be acid sensitive) | 1-9% |
| Surfactants | 0.1-2.0% |
| Film-forming agent (can be acid sensitive) | 10-25% |
| Viscosity modifying agent/Humectant | 10-40% |
| Buffer (basic/amine) | 0.1-0.4% |
| Deionized water | QS to 100% |
| pH Buffering | higher than 7 |

The following exemplary translucent colored composition, according to some embodiments of the present invention, was prepared using an acid sensitive carboxylated polymer and/or an acid sensitive emulsified acrylic polymer:

| | |
|---|---|
| Pigment (C, M, Y or K) | 2-4% |
| Carboxylated polymer (Dispersant) | 5% |
| Surfactant Polyether dimethyl siloxane | 2% |
| Glycols/glycerin | 40% |
| Emulsified acrylic polymer (40-50% solid) | 30% |
| Carbodiimide crosslinker (or melamine or melamine based crosslinker with carbamate functionality) | 3% |
| Amine (buffering) | 0.1-0.4% |
| Deionized water | QS to 100% |
| pH buffered to | 7.5 |

Optional Opaque Underbase Composition:

A typical opaque underbase composition, according to some embodiments of the present invention, is generally formulated using at least one ingredient with is acid sensitive such that is caused the underbase composition to coagulate upon contacting an acid. The underbase composition is formed using the following ingredients, with amounts given in percent by weight of the total weight of the composition:

| | |
|---|---|
| Opaque white pigment | 8-12% |
| Dispersant (can be acid sensitive) | 4% |
| Surfactant | 0.3-0.6% |
| Defoamer | 0.3-0.6% |
| Film-forming agent emulsion (can be acid sensitive) | 40-50% (solids) |
| Crosslinkers | 1-3% |
| Humectant | 35-50% |
| Buffer (basic/amine) | 0.1-0.4% |
| Deionized water | QS to 100% |
| pH buffered to | higher than 7 |

The following exemplary opaque underbase composition, according to some embodiments of the present invention, was prepared using an acid sensitive acrylic emulsion and/or an acid sensitive polyacrylate dispersant:

| | |
|---|---|
| Titania | 10% |
| High MW polyacrylate dispersant | 3.8% |
| Polyether dimethyl siloxane | 0.4% |
| Acrylate sodium salt | 1.5% |
| Glycols | 25% |
| Acrylic emulsion | 38% |
| Carbodiimide crosslinker (or melamine or melamine based crosslinker with carbamate | 3% |

| | |
|---|---|
| functionality) | |
| Tertiary Amine | 0.2% |
| Deionized water | QS to 100% |
| pH buffered to | 7.5 |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An immobilizing composition for direct inkjet printing an image on a fabric substrate, comprising a plurality of wax particles, a surfactant, a property-adjusting agent and an immobilizing composition carrier, said property-adjusting agent lowers a pH level at a surface of the fabric substrate, thereby effecting immobilization of an ink composition upon contacting said ink composition with the immobilizing composition on said surface, the composition is substantially devoid of a colorant, and having a pH that ranges from 3 to 6, and suitable for direct inkjet printing, wherein:
   said property-adjusting agent is substantially eliminated upon heating to at least 120° C., and
   said wax particles impart at least 60% colorfastness to rubbing to the image on the fabric substrate.

2. The immobilizing composition of claim 1, wherein an average size of said particles ranges from 0.1 microns to 10 microns.

3. The immobilizing composition of claim 1, wherein a solid contents of said wax particles ranges from 0.1% to 4% of the total weight of the composition.

4. The immobilizing composition of claim 1, being for application from a nozzle is characterized by at least one of:
   a maximal particle size of less than 15 micron;
   a dynamic viscosity at shear that ranges from 2 to 4 $(N \cdot s)/m^2$;
   a room temperature Brookfield viscosity less than 3 centipoises;
   a surface tension that ranges from 24 to 26 N/m; and
   an electrical resistance of 50 to 2000 ohm per centimeter.

5. The immobilizing composition of claim 1, being for application from a printhead is characterized by at least one of:
   a maximal particle size of less than 10 microns;
   a dynamic viscosity at shear that ranges from 8 to 20 $(N \cdot s)/m^2$;
   a room temperature Brookfield viscosity less than 25 centipoises;
   a surface tension that ranges from 24 to 32 N/m; and
   an electrical resistance of 50 to 2000 ohm per centimeter.

6. The immobilizing composition of claim 1, wherein said surfactant is a cationic surfactant.

7. The immobilizing composition of claim 1, wherein said wax is an oxidized polyethylene wax.

8. The immobilizing composition of claim 1, wherein said property-adjusting agent is an acid.

9. The immobilizing composition of claim 8, wherein said acid is an organic acid.

10. The immobilizing composition of claim 8, wherein said acid is a transitory acid.

11. The immobilizing composition of claim 8, wherein said acid is an acidic polymer.

12. The immobilizing composition of claim 1, wherein said ink composition comprises a colorant, a property-sensitive agent and an ink composition carrier.

13. An inkjet printing kit comprising the immobilizing composition of claim 1 and an ink composition, wherein said ink composition comprises a colorant, a property-sensitive agent and an ink composition carrier, and suitable for direct inkjet printing.

14. The kit of claim 13, wherein each of said immobilizing composition and said ink composition are packaged separately in a packaging material.

15. The kit of claim 14, wherein the immobilizing composition is identified in print, in or on said packaging material, for use in immobilizing said ink composition upon contacting said ink composition.

16. A process of printing an image directly on a substrate, comprising contacting at least a portion of the substrate with the immobilizing composition of claim 1, and applying an ink composition on said portion of the substrate, thereby printing the image, wherein said ink composition comprises a colorant, a property-sensitive agent and an ink composition carrier.

17. The process of claim 16, wherein said immobilizing composition and said ink composition are each individually applied on said portion of the substrate by a separate applicator.

18. The process of claim 17, wherein said immobilizing composition is applied by a nozzle.

19. The process of claim 17, wherein said ink composition is applied by an inkjet printhead.

20. The process of claim 16, wherein said ink composition is applied on said substrate while said substrate is still wet with said immobilizing composition.

21. The process of claim 16, further comprising curing the image subsequent to said applying said ink composition.

22. A substrate having an image printed thereon, wherein the image is in the form of a film attached to the substrate and said film is formed directly on the substrate by contacting the substrate with the immobilizing composition of claim 1, and applying said ink composition on the substrate, thereby forming the image.

* * * * *